US011138628B2

(12) United States Patent
Solotaroff et al.

(10) Patent No.: US 11,138,628 B2
(45) Date of Patent: Oct. 5, 2021

(54) PROMOTION OFFER LANGUAGE AND METHODS THEREOF

(71) Applicants: Jacob Solotaroff, Palo Alto, CA (US); Michael Klein, Palo Alto, CA (US)

(72) Inventors: Jacob Solotaroff, Palo Alto, CA (US); Michael Klein, Palo Alto, CA (US)

(73) Assignee: Eversight, Inc., Palo Alto, CA (US)

( * ) Notice: Subject to any disclaimer, the term of this patent is extended or adjusted under 35 U.S.C. 154(b) by 0 days.

(21) Appl. No.: 14/530,658

(22) Filed: Oct. 31, 2014

(65) Prior Publication Data

US 2017/0017990 A1   Jan. 19, 2017

Related U.S. Application Data

(63) Continuation-in-part of application No. 14/231,440, filed on Mar. 31, 2014, now Pat. No. 10,438,231, which is a continuation-in-part of application No. 14/209,851, filed on Mar. 13, 2014, now Pat. No. 9,984,387.

(60) Provisional application No. 61/780,630, filed on Mar. 13, 2013.

(51) Int. Cl.
*G06Q 30/00* (2012.01)
*G06Q 30/02* (2012.01)
*G06Q 10/06* (2012.01)
*G06Q 10/00* (2012.01)

(52) U.S. Cl.
CPC ......... *G06Q 30/0244* (2013.01); *G06Q 10/00* (2013.01); *G06Q 10/063* (2013.01); *G06Q 30/0242* (2013.01); *G06Q 30/0245* (2013.01)

(58) Field of Classification Search
CPC ........... G06Q 30/0277; G06Q 30/0269; G06Q 30/02; G06Q 30/0244; G06Q 10/00; G06Q 10/063; G06Q 30/0242
See application file for complete search history.

(56) References Cited

U.S. PATENT DOCUMENTS

| | | |
|---|---|---|
| 6,084,583 A | 7/2000 | Gerszberg et al. |
| 6,577,982 B1 | 6/2003 | Erb |
| 7,158,959 B1 | 1/2007 | Chickering et al. |
| 7,200,527 B1 | 4/2007 | Davidov et al. |
| 7,376,603 B1 | 5/2008 | Mayr et al. |
| 7,581,212 B2 * | 8/2009 | West ................. G06F 40/154 717/136 |
| 7,639,727 B1 | 12/2009 | Brisebois et al. |
| 8,140,402 B1 | 3/2012 | Mesaros |
| 8,606,626 B1 | 12/2013 | Desoto et al. |

(Continued)

OTHER PUBLICATIONS

Albrecht; An Ontological Approach to Evaluating Standards; IEEE 2007; pp. 846-859; 2007.*

(Continued)

*Primary Examiner* — Radu Andrei
(74) *Attorney, Agent, or Firm* — Kang S. Lim

(57) ABSTRACT

Methods and apparatus for implementing a promotion offer language architecture for representing offer. The promotion offer language architecture includes at least an offer type field and an offer expression field. The offer type field pertains to the type of offer. The offer expression field pertains to identification of items that the offer applies to and/or the condition required to receive the benefits of the offer type. The item is identified by a quantity and a product identification.

10 Claims, 16 Drawing Sheets

(56) References Cited

U.S. PATENT DOCUMENTS

| | | |
|---|---|---|
| 8,972,391 B1 | 3/2015 | McDonnell et al. |
| 2001/0018665 A1 | 8/2001 | Sullivan et al. |
| 2002/0023117 A1 | 2/2002 | Bernardin et al. |
| 2002/0026351 A1 | 2/2002 | Coleman |
| 2002/0087453 A1* | 7/2002 | Nicolaisen ............ G06Q 40/04 705/37 |
| 2002/0161641 A1* | 10/2002 | Quinlan ............ G06Q 30/0224 705/14.25 |
| 2002/0169700 A1 | 11/2002 | Huffman et al. |
| 2002/0184086 A1 | 12/2002 | Linde |
| 2003/0020758 A1* | 1/2003 | Hinderks ............ H04L 12/1859 715/809 |
| 2003/0130580 A1 | 7/2003 | Kenyon |
| 2003/0149938 A1 | 8/2003 | McElfresh et al. |
| 2003/0204437 A1 | 10/2003 | Flender et al. |
| 2003/0233246 A1 | 12/2003 | Snapp et al. |
| 2004/0093542 A1 | 5/2004 | Isodono et al. |
| 2004/0123247 A1* | 6/2004 | Wachen ............ G06F 40/174 715/267 |
| 2004/0133457 A1 | 7/2004 | Sadiq et al. |
| 2004/0148211 A1* | 7/2004 | Honarvar ............ G06Q 10/0639 705/7.11 |
| 2004/0223648 A1 | 11/2004 | Hoene et al. |
| 2005/0086638 A1* | 4/2005 | Fam ............ G06F 8/33 717/113 |
| 2005/0096963 A1 | 5/2005 | Myr et al. |
| 2005/0189415 A1 | 9/2005 | Fano et al. |
| 2005/0246206 A1 | 11/2005 | Obora et al. |
| 2005/0256778 A1 | 11/2005 | Boyd et al. |
| 2005/0273376 A1 | 12/2005 | Ouimet et al. |
| 2006/0167917 A1 | 7/2006 | Solomon |
| 2006/0259835 A1 | 11/2006 | Marinissen et al. |
| 2006/0271671 A1 | 11/2006 | Hansen |
| 2007/0022003 A1 | 1/2007 | Chao et al. |
| 2008/0021909 A1 | 1/2008 | Black et al. |
| 2008/0033784 A1 | 2/2008 | Chalimadugu et al. |
| 2008/0033808 A1 | 2/2008 | Black et al. |
| 2008/0104618 A1* | 5/2008 | Rogers ............ G09B 5/00 719/328 |
| 2008/0127127 A1* | 5/2008 | Chitgupakar ............ G06F 8/51 717/137 |
| 2008/0140502 A1 | 6/2008 | Birnholz et al. |
| 2008/0189156 A1 | 8/2008 | Voda et al. |
| 2008/0306830 A1 | 12/2008 | Lasa et al. |
| 2009/0017913 A1 | 1/2009 | Bell et al. |
| 2009/0030785 A1 | 1/2009 | Goyal et al. |
| 2009/0204472 A1 | 8/2009 | Einhorn |
| 2009/0254413 A1 | 10/2009 | Chang et al. |
| 2009/0282343 A1 | 11/2009 | Catlin et al. |
| 2009/0292588 A1 | 11/2009 | Duzevik et al. |
| 2009/0292771 A1* | 11/2009 | Bertoni ............ H04L 67/26 709/204 |
| 2009/0307073 A1 | 12/2009 | MirrokniBanadaki et al. |
| 2009/0313109 A1 | 12/2009 | Bous |
| 2010/0049679 A1* | 2/2010 | Phillips ............ G06N 5/025 706/15 |
| 2010/0153332 A1 | 6/2010 | Rollins et al. |
| 2010/0175084 A1 | 7/2010 | Ellis et al. |
| 2010/0179855 A1 | 7/2010 | Chen et al. |
| 2010/0250714 A1 | 9/2010 | Wehmann et al. |
| 2010/0274661 A1* | 10/2010 | Aaltonen ............ G06Q 30/02 705/14.42 |
| 2011/0035379 A1 | 2/2011 | Chen et al. |
| 2011/0040756 A1 | 2/2011 | Jones et al. |
| 2011/0045831 A1 | 2/2011 | Chiu et al. |
| 2011/0119100 A1* | 5/2011 | Ruhl ............ G06Q 10/06 705/7.11 |
| 2011/0119155 A1 | 5/2011 | Hammad et al. |
| 2011/0161113 A1 | 6/2011 | Rumak et al. |
| 2011/0173055 A1 | 7/2011 | Ross et al. |
| 2011/0246994 A1 | 10/2011 | Kimbrel et al. |
| 2011/0258049 A1 | 10/2011 | Ramer et al. |
| 2011/0295722 A1 | 12/2011 | Reisman |
| 2011/0313835 A1 | 12/2011 | Falkenborg et al. |
| 2012/0158099 A1 | 6/2012 | Lee |
| 2012/0221372 A1 | 8/2012 | Vasko |
| 2012/0264089 A1 | 10/2012 | Hoang et al. |
| 2012/0290399 A1 | 11/2012 | England et al. |
| 2013/0030868 A1 | 1/2013 | Lyon et al. |
| 2013/0073388 A1 | 3/2013 | Heath |
| 2013/0085838 A1 | 4/2013 | Tennenholtz et al. |
| 2013/0085844 A1 | 4/2013 | Neystadt et al. |
| 2013/0091019 A1 | 4/2013 | Mallon et al. |
| 2013/0097006 A1 | 4/2013 | Evans et al. |
| 2013/0110641 A1 | 5/2013 | Ormont et al. |
| 2013/0110880 A1 | 5/2013 | Farchi et al. |
| 2013/0124257 A1 | 5/2013 | Schubert |
| 2013/0138812 A1 | 5/2013 | Assuncao et al. |
| 2013/0148813 A1 | 6/2013 | Sengupta et al. |
| 2013/0151332 A1 | 6/2013 | Yan et al. |
| 2013/0185147 A1 | 7/2013 | Letca et al. |
| 2013/0238416 A1 | 9/2013 | Richard |
| 2013/0238617 A1 | 9/2013 | Postrel |
| 2013/0254151 A1 | 9/2013 | Mohagheghi et al. |
| 2013/0297543 A1 | 11/2013 | Treiser |
| 2013/0317894 A1* | 11/2013 | Zhu ............ G06Q 30/02 705/14.13 |
| 2013/0331999 A1 | 12/2013 | Vaughn et al. |
| 2013/0346302 A1 | 12/2013 | Purves et al. |
| 2014/0006129 A1 | 1/2014 | Heath |
| 2014/0025391 A1 | 1/2014 | Knowles et al. |
| 2014/0040007 A1 | 2/2014 | Relyea, Jr. et al. |
| 2014/0046757 A1 | 2/2014 | Kahn et al. |
| 2014/0046872 A1 | 2/2014 | Arnott et al. |
| 2014/0081636 A1 | 3/2014 | Erhart et al. |
| 2014/0081741 A1 | 3/2014 | Katsur |
| 2014/0095611 A1 | 4/2014 | Weinstein et al. |
| 2014/0122200 A1 | 5/2014 | Granville |
| 2014/0136537 A1 | 5/2014 | Nelson et al. |
| 2014/0143405 A1 | 5/2014 | Pavlidis et al. |
| 2014/0180790 A1 | 6/2014 | Boal |
| 2014/0278786 A1 | 9/2014 | Liu-Qiu-Yan |
| 2014/0278798 A1 | 9/2014 | Goyal et al. |
| 2014/0337120 A1 | 11/2014 | Ercanbrack |
| 2015/0019325 A1 | 1/2015 | Li et al. |
| 2015/0049924 A1 | 2/2015 | Tang et al. |
| 2015/0050970 A1 | 2/2015 | Racho |
| 2015/0112790 A1* | 4/2015 | Wolinsky ............ G06Q 20/32 705/14.38 |
| 2015/0117631 A1 | 4/2015 | Tuchman et al. |
| 2015/0150023 A1 | 5/2015 | Johnson et al. |
| 2015/0310188 A1 | 10/2015 | Ford et al. |
| 2016/0155193 A1 | 6/2016 | Merrill et al. |
| 2016/0162931 A1 | 6/2016 | Harik et al. |
| 2017/0249664 A1 | 8/2017 | Harik et al. |
| 2017/0270584 A1* | 9/2017 | Chow ............ G01S 19/14 |

OTHER PUBLICATIONS

Cui; Constrained Optimization with Genetic Algorithm; IEEE 2010; pp. 26-30; 2010.*

* cited by examiner

$ OFF TEMPLATES
$ off Qty Product A
$ off either Qty Product A or Qty Product B
$ off when you buy both Qty Product A and Qty Product B
When you buy Qty Product A, $ off Qty Product B
When you buy Qty Product A, $ off either Qty Product B or Qty Product C
When you buy both Qty Product A and Qty Product B, $ off Qty Product C

⎫ 1002

$ OFF TEMPLATES
$ off Qty Product A
$ off either Qty Product A or Qty Product B
$ off when you buy both Qty Product A and Qty Product B
When you buy Qty Product A, % off Qty Product B
When you buy Qty Product A, % off either Qty Product B or Qty Product C
When you buy both Qty Product A and Qty Product B, % off Qty Product C

⎫ 1004

FREE TEMPLATES
Buy Qty Product A, get Qty Free
Buy Qty Product A, get Qty Product B Free
Buy either Qty Product A or Qty Product B, get Qty Product C Free
Buy both Qty Product A or Qty Product B, get Qty Product C Free

⎫ 1006

TOTAL PRICE TEMPLATES
Buy Qty Product A for total price
Buy both Qty Product A or Qty Product B for total price

1400 ─ <pol-expr>    ::= offer <offer-type> on <buy-expr>
1406 ─ <offer-type>  ::= dollar_off | percent_off | free | total_price
1410 ─ <buy-expr>    ::= buy(<s-item-expr>)
1412 ─ <s-item-expr> ::= * <item-expr> | <item-expr>
       <item-expr>   ::= item(<qty>, <product>)
                       | (<s-item-expr> and <s-item-expr>)
                       | (<s-item-expr> or <s-item-expr>)

1430 ─ <qty>         ::= { + *identifier* + }
1432 ─ <product>     ::= { + *identifier* + }

FIG. 14 offer dollar_off on buy(item1({qty}, {product})) ⎬ 1502A
=> Get $ off when buying product. ⎬ 1502B offer percent_off on
  buy( item({qtyA}, {productA}) and *item({qtyB}, {productB})) ⎬ 1504A
=> Get % off productB when buying both productA and productB. ⎬ 1504B offer free on buy(item({qtyA}, {productA}) and *item({qtyB}, {productA})) ⎬ 1506A
=> Buy qtyA of productA, get qtyB of productA free; BOGO ⎬ 1506B offer total_price on buy(
  item({qtyA}, {productA}) and (
    item({qtyB}, {productB}) or item({qtyC}, {productC}) ⎬ 1508A
=> Buy qtyA of productA and either qtyB of productB or qtyC or productC ⎬ 1508B
for a fixed price.

FIG. 15

PROMOTION OFFER LANGUAGE AND METHODS THEREOF

PRIORITY CLAIM

The present invention is a continuation-in-part of a commonly owned US patent application entitled "Automatic Offer Generation Using Concept Generator Apparatus and Methods Thereof," U.S. application Ser. No. 14/231,440, filed in the USPTO on Mar. 31, 2014, by inventor Moran et al., which is a continuation-in-part of a commonly owned patent application entitled "Architecture and Methods for Promotion Optimization," U.S. application Ser. No. 14/209,851, filed in the USPTO on Mar. 13, 2014, by inventor Moran, which claims priority under 35 U.S.C. 119(e) to a commonly owned US provisional patent application entitled "Architecture and Methods for Promotion Optimization," U.S. Application No. 61/780,630, filed in the USPTO on Mar. 13, 2013, by inventor Moran, all of which is incorporated herein by reference.

RELATED APPLICATIONS

The present invention is related to the following applications, all of which are incorporated herein by reference:

Commonly owned application entitled "Adaptive Experimentation and Optimization in Automated Promotional Testing," application Ser. No. 14/231,426, filed on Mar. 31, 2014 in the USPTO by Moran et al.

Commonly owned application entitled "Automated and Optimal Promotional Experimental Test Designs Incorporating Constraints," application Ser. No. 14/231,432, filed on Mar. 31, 2014 in the USPTO by Moran et al.

Commonly owned application entitled "Automated Event Correlation to Improve Promotional Testing," application Ser. No. 14/231,442, on Mar. 31, 2014 in the USPTO by Moran et al.

Commonly owned application entitled "Automated Promotion Forecasting and Methods Therefor," application Ser. No. 14/231,460, filed on Mar. 31, 2014 in the USPTO by Moran et al.

Commonly owned application entitled "Automated Behavioral Economics Patterns in Promotion Testing and Methods Therefor," application Ser. No. 14/231,555, filed on Mar. 31, 2014 in the USPTO by Moran et al.

Commonly owned application entitled "Automatic Mass Scale Online Promotion Testing," application Ser. No. 14/311,250, filed Jun. 21, 2014 in the USPTO by Moran et al.

BACKGROUND OF THE INVENTION

The present invention relates to promotion optimization methods and apparatus therefor. More particularly, the present invention relates to computer-implemented methods and computer-implemented apparatus for optimizing promotions.

Promotion refers to various practices designed to increase sales of a particular product or services and/or the profit associated with such sales. Generally speaking, the public often associates promotion with the sale of consumer goods and services, including consumer packaged goods (e.g., food, home and personal care), consumer durables (e.g., consumer appliances, consumer electronics, automotive leasing), consumer services (e.g., retail financial services, health care, insurance, home repair, beauty and personal care), and travel and hospitality (e.g., hotels, airline flights, and restaurants). Promotion is particularly heavily involved in the sale of consumer packaged goods (i.e., consumer goods packaged for sale to an end consumer). However, promotion occurs in almost any industry that offers goods or services to a buyer (whether the buyer is an end consumer or an intermediate entity between the producer and the end consumer).

The term promotion may refer to, for example, providing discounts (using for example a physical or electronic coupon or code designed to, for example, promote the sales volume of a particular product or service. One aspect of promotion may also refer to the bundling of goods or services to create a more desirable selling unit such that sales volume may be improved. Another aspect of promotion may also refer to the merchandising design (with respect to looks, weight, design, color, etc.) or displaying of a particular product with a view to increasing its sales volume. It includes calls to action or marketing claims used in-store, on marketing collaterals, or on the package to drive demand. Promotions may be composed of all or some of the following: price based claims, secondary displays or aisle end-caps in a retail store, shelf signage, temporary packaging, placement in a retailer circular/flyer/coupon book, a colored price tag, advertising claims, or other special incentives intended to drive consideration and purchase behavior. These examples are meant to be illustrative and not limiting.

In discussing various embodiments of the present invention, the sale of consumer packaged goods (hereinafter "CPG") is employed to facilitate discussion and ease of understanding. It should be kept in mind, however, that the promotion optimization methods and apparatuses discussed herein may apply to any industry in which promotion has been employed in the past or may be employed in the future.

Further, price discount is employed as an example to explain the promotion methods and apparatuses herein. It should be understood, however, that promotion optimization may be employed to manipulate factors other than price discount in order to influence the sales volume. An example of such other factors may include the call to action on a display or on the packaging, the size of the CPG item, the manner in which the item is displayed or promoted or advertised either in the store or in media, etc.

Generally speaking, it has been estimated that, on average, 17% of the revenue in the consumer packaged goods (CPG) industry is spent to fund various types of promotions, including discounts, designed to entice consumers to try and/or to purchase the packaged goods. In a typical example, the retailer (such as a grocery store) may offer a discount online or via a print circular to consumers. The promotion may be specifically targeted to an individual consumer (based on, for example, that consumer's demographics or past buying behavior). The discount may alternatively be broadly offered to the general public. Examples of promotions offered to general public include for example, a printed or electronic redeemable discount (e.g., coupon or code) for a specific CPG item. Another promotion example may include, for example, general advertising of the reduced price of a CPG item in a particular geographic area. Another promotion example may include in-store marking down of a particular CPG item only for a loyalty card user base.

In an example, if the consumer redeems the coupon or electronic code, the consumer is entitled to a reduced price for the CPG item. The revenue loss to the retailer due to the redeemed discount may be reimbursed, wholly or partly, by the manufacturer of the CPG item in a separate transaction.

Because promotion is expensive (in terms of for example, the effort to conduct a promotion campaign and/or the per-unit revenue loss to the retailer/manufacturer when the consumer decides to take advantage of the discount), efforts are continually made to minimize promotion cost while maximizing the return on promotion dollars investment. This effort is known in the industry as promotion optimization.

For example, a typical promotion optimization method may involve examining the sales volume of a particular CPG item over time (e.g., weeks). The sales volume may be represented by a demand curve as a function of time, for example. A demand curve lift (excess over baseline) or dip (below baseline) for a particular time period would be examined to understand why the sales volume for that CPG item increases or decreases during such time period.

FIG. 1 shows an example demand curve 102 for Brand X cookies over some period of time. Two lifts 110 and 114 and one dip 112 in demand curve 102 are shown in the example of FIG. 1. Lift 110 shows that the demand for Brand X cookies exceeds the baseline at least during week 2. By examining the promotion effort that was undertaken at that time (e.g., in the vicinity of weeks 1-4 or week 2) for Brand X cookies, marketers have in the past attempted to judge the effectiveness of the promotion effort on the sales volume. If the sales volume is deemed to have been caused by the promotion effort and delivers certain financial performance metrics, that promotion effort is deemed to have been successful and may be replicated in the future in an attempt to increase the sales volume. On the other hand, dip 112 is examined in an attempt to understand why the demand falls off during that time (e.g., weeks 3 and 4 in FIG. 1). If the decrease in demand was due to the promotion in week 2 (also known as consumer pantry loading or retailer forward-buying, depending on whether the sales volume shown reflects the sales to consumers or the sales to retailers), this decrease in weeks 3 and 4 should be counted against the effectiveness of week 2.

One problem with the approach employed in the prior art has been the fact that the prior art approach is a backward-looking approach based on aggregate historical data. In other words, the prior art approach attempts to ascertain the nature and extent of the relationship between the promotion and the sales volume by examining aggregate data collected in the past. The use of historical data, while having some disadvantages (which are discussed later herein below), is not necessarily a problem. However, when such data is in the form of aggregate data (such as in simple terms of sales volume of Brand X cookies versus time for a particular store or geographic area), it is impossible to extract from such aggregate historical data all of the other factors that may more logically explain a particular lift or dip in the demand curve.

To elaborate, current promotion optimization approaches tend to evaluate sales lifts or dips as a function of four main factors: discount depth (e.g., how much was the discount on the CPG item), discount duration (e.g., how long, did the promotion campaign last), timing (e.g., whether there was any special holidays or event or weather involved), and promotion type (e.g., whether the promotion was a price discount only whether Brand X cookies were displayed/not displayed prominently, whether Brand X cookies were features/not featured in the promotion literature).

However, there may exist other factors that contribute to the sales lift or dip, and such factors are often not discoverable by examining, in a backward-looking manner, the historical aggregate sales volume data for Brand X cookies. This is because there is not enough information in the aggregate sales volume data to enable the extraction of information pertaining to unanticipated or seemingly unrelated events that may have happened during the sales lifts and dips and may have actually contributed to the sales lifts and dips.

Suppose, for example, that there was a discount promotion for Brand X cookies during the time when lift 110 in the demand curve 102 happens. However, during the same time, there was a breakdown in the distribution chain of Brand Y cookies, a competitor's cookies brand which many consumers view to be an equivalent substitute for Brand X cookies. With Brand Y cookies being in short supply in the store, many consumers bought Brand X instead for convenience sake. Aggregate historical sales volume data for Brand X cookies, when examined after the fact in isolation by Brand X marketing, department thousands of miles away, would not uncover that fact. As a result, Brand X marketers may make the mistaken assumption that the costly promotion effort of Brand X cookies was solely responsible for the sales lift and should be continued, despite the fact that it was an unrelated event that contributed to most of the lift in the sales volume of Brand X cookies.

As another example, suppose, for example, that milk produced by a particular unrelated vendor was heavily promoted in the same grocery store or in a different grocery store nearby during the week that Brand X cookies experienced the sales lift 110. The milk may have been highlighted in the weekly circular, placed in a highly visible location in the store and/or a milk industry expert may have been present in the store to push buyers to purchase milk, for example. Many consumers ended up buying milk because of this effort whereas some of most of those consumers who bought during the milk promotion may have waited another week or so until they finished consuming the milk they bought in the previous weeks. Further, many of those milk buying consumers during this period also purchased cookies out of an ingrained milk-and-cookies habit. Aggregate historical sales volume data for Brand X cookies would not uncover that fact unless the person analyzing the historical aggregate sales volume data for Brand X cookies happened to be present in the store during that week and had the insight to note that milk was heavily promoted that week and also the insight that increased milk buying may have an influence on the sales volume of Brand X cookies.

Software may try to take these unanticipated events into account but unless every SKU (stock keeping unit) in that store and in stores within commuting distance and all events, whether seemingly related or unrelated to the sales of Brand X cookies, are Modeled, it is impossible to eliminate data noise from the backward-looking analysis based on aggregate historical sales data.

Even without the presence of unanticipated factors, a marketing person working for Brand X may be interested in knowing whether the relatively modest sales lift 114 comes from purchases made by regular Brand X cookies buyers or by new buyers being enticed by some aspect of the promotion campaign to buy Brand X cookies for the first time. If Brand X marketer can ascertain that most of the lift in sales during the promotion period that spans lift 114 comes from new consumers of Brand. X cookies, such marketer may be willing to spend more money on the same type of sales promotion, even to the point of tolerating a negative ROI (return on investment) on his promotion dollars for this particular type of promotion since the recruitment of new buyers to a brand is deemed more much valuable to the company in the long run than the temporary increase in sales to existing Brand X buyers. Again, aggregate historical sales volume data for Brand X cookies, when examined in a backward-looking manner, would not provide such information.

Furthermore, even if all unrelated and related events and factors can be modeled, the fact that the approach is backward-looking means that there is no way to validate the hypothesis about the effect an event has on the sales volume since the event has already occurred in the past. With respect to the example involving the effect of milk promotion on Brand X cookies sales, there is no way to test the theory short of duplicating the milk shortage problem again. Even if the milk shortage problem could be duplicated again for testing purposes, other conditions have changed, including the fact that most consumers who bought milk during that period would not need to or be in a position to buy milk again in a long time. Some factors, such as weather, cannot be duplicated, making theory verification challenging.

Attempts have been made to employ non-aggregate sales data in promoting products. For example, some companies may employ a loyalty card program (such as the type commonly used in grocery stores or drug stores) to keep track of purchases by individual consumers. If an individual consumer has been buying sugar-free cereal, for example, the manufacturer of a new type of whole grain cereal may wish to offer a discount to that particular consumer to entice that consumer to try out the new whole grain cereal based on the theory that people who bought sugar-free cereal tend to be more health conscious and thus more likely to purchase whole grain cereal than the general cereal-consuming public. Such individualized discount may take the form of, for example, a redeemable discount such as a coupon or a discount code mailed or emailed to that individual.

Some companies may vary the approach by, for example, ascertaining the items purchased by the consumer at the point of sale terminal and offering a redeemable code on the purchase receipt Irrespective of the approach taken, the utilization of non-aggregate sales data has typically resulted in individualized offers, and has not been processed or integrated in any meaningful sense into a promotion optimization effort to determine the most cost-efficient, highest-return manner to promote a particular CPG item to the general public.

Attempts have also been made to obtain from the consumers themselves indications of future buying behavior instead of relying on a backward-looking approach. For example, conjoint studies, one of the stated preference methods, have been attempted in which consumers are asked to state preferences. In an example conjoint study, a consumer may be approached at the store and asked a series of questions designed to uncover the consumer's future shopping behavior when presented with different promotions. Questions may be asked include, for example, "do you prefer Brand X or Brand Y" or "do you spend less than $100 or more than $100 weekly on grocery" or "do you prefer chocolate cookies or oatmeal cookies" or "do you prefer a 50-cent-off coupon or a 2-for-1 deal on cookies". The consumer ma state his preference on each of the questions posed (thus making this study a conjoint study on stated preference).

However, such conjoint studies have proven to be an expensive way to obtain non-historical data. If the conjoint studies are presented via a computer, most users may ignore the questions and/or refuse to participate. If human field personnel are employed to talk to individual consumers to conduct the conjoint study, the cost of such studies tends to be quite high due to salary cost of the human field personnel and may make the extensive use of such conjoint studies impractical.

Further and more importantly, it has been known that conjoint studies are somewhat unreliable in gauging actual purchasing behavior by consumers in the future. An individual may state out of guilt and the knowledge that be needs to lose weight that he will not purchase any cookies in the next six months, irrespective of discounts. In actuality, that individual may pick up a package of cookies every week if such package is carried in a certain small size that is less guilt-inducing and/or if the package of cookies is prominently displayed next to the milk refrigerator and/or if a 10% off discount coupon is available. If a promotion effort is based on such flawed stated preference data, discounts may be inefficiently deployed in the future, costing the manufacturer more money than necessary for the promotion.

Finally, none of the approaches track the long-term impact of a promotion's effect on brand equity for an individual's buying behavior over time. Some promotions, even if deemed a success by traditional short-term measures, could have damaging long-term consequences. Increased price-based discounting, for example, can lead to consumers increasing the weight of price in determining their purchase decisions, making consumers more deal-prone and reluctant to buy at full price, leading to less loyalty to brands and retail outlets.

In view of the foregoing, there are desired improved methods and apparatuses for optimizing, promotions in a manner that results in cost-effective, high-return, and timely promotions to the general public.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which:

FIG. 10 shows, in greater detail and in accordance with an embodiment of the invention, example options that may be selected by the user via offer template module 904.

FIG. 14 shows, in accordance with an embodiment of the invention, in greater detail the grammar structure of the promotion offer language statement that can be employed to represent a promotion offer to a computer and/or human stakeholders.

FIG. 15 shows various examples of the promotion offer language statements and corresponding explanations thereof.

DETAILED DESCRIPTION OF EMBODIMENTS

Figure 1:
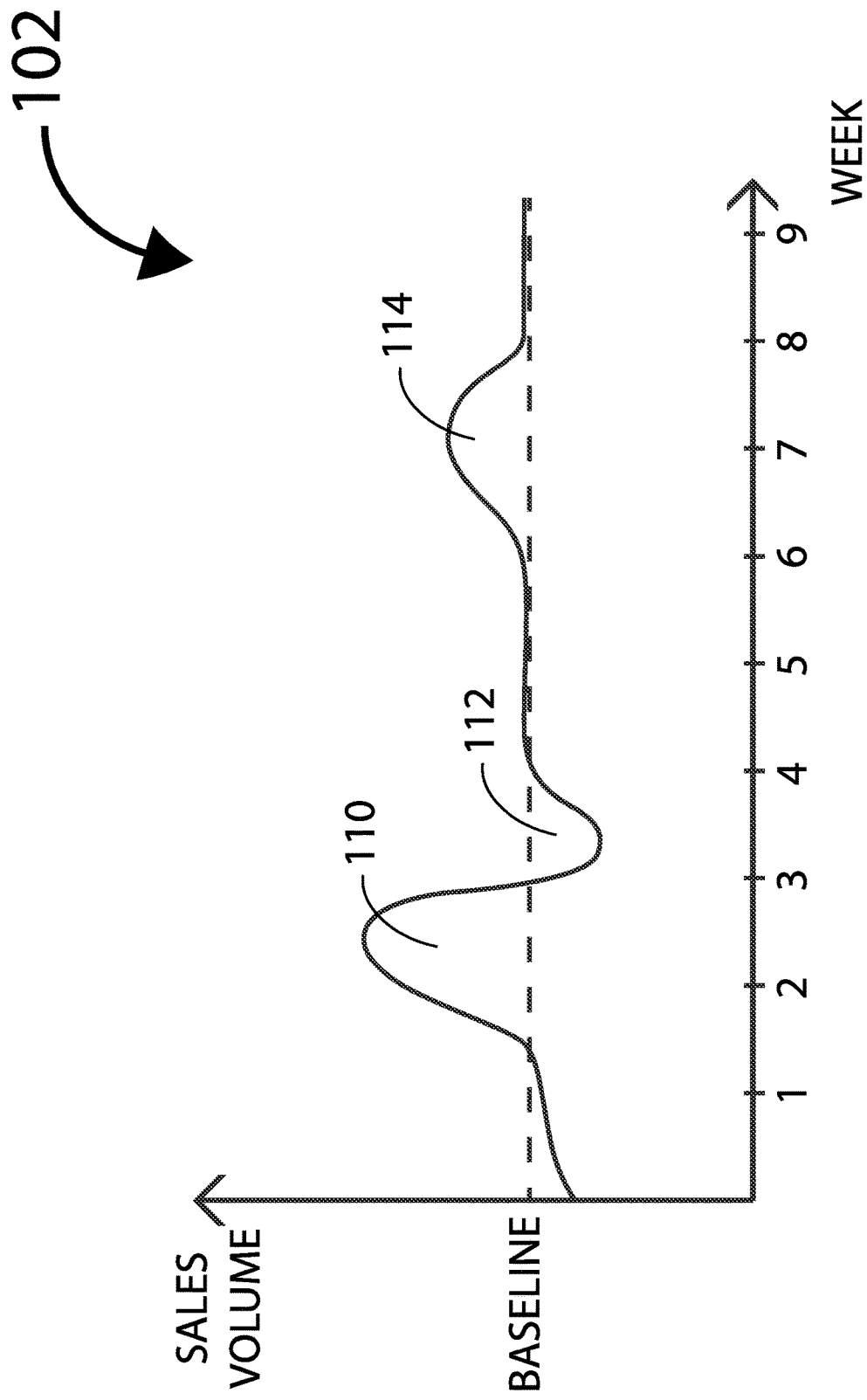
FIG. 1 shows an example demand curve 102 for Brand X cookies over some period of time.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include any of the data processing devices, including for example smart phones, tablet computers, laptop computers, or a general-purpose computers and/or dedicated computing devices when appropriately programmed and may include a combination of a computer/computing device and dedicated/programmable circuits adapted for the various tasks pertaining to embodiments of the invention. Such a data processing device include, as is well-known, at least a processor unit, a memory unit, a graphic processing unit, a data storage unit (such as a had drive or semiconductor-based data storage device), one or more I/O circuits, one or more data communication sub-systems, and/or operating system/applications for executing executable code. Data processing devices are well-known and are not discussed in greater detail herein for brevity's sake. The apparatuses may be stand-alone or may be coupled together using a network, such as a local area network, an intranet, an internet, or an combination thereof.

One or more embodiments of the invention relate to methods and apparatus for optimizing promotions by administering, in large numbers and iteratively, test promotions on purposefully segmented subpopulations in advance of a general public promotion roll-out. In one or more embodiments, the inventive forward-looking promotion optimization (FL-PO) involves obtaining actual revealed preferences from individual consumers of the segmented subpopulations being tested.

The revealed preferences are obtained when the individual consumers respond to specifically designed actual test promotions. The revealed preferences are tracked in individual computer-implemented accounts (which may, for example, be implemented via a record in a centralized database and rendered accessible to the merchant or the consumer via a computer network, such as the internet) associated with individual consumers. For example, when a consumer responds, using his smart phone or web browser, to a test promotion that offers 20% off a particular consumer packaged goods (CPG) item, that response is tracked in his individual computer-implemented account. Such computer-implemented accounts may be implemented via, for example, a loyalty card program, apps on a smart phone, computerized records accessible via a browser, social media news feed, etc.

In one or more embodiments, a plurality of test promotions may be designed and tested on a plurality of groups of consumers (the groups of consumers are referred to herein as "subpopulations"). The responses by the consumers are recorded and analyzed, with the analysis result employed to generate additional test promotions or to formulate the general population promotion.

As will be discussed later herein, if the consumer actually redeems the offer, one type of response is recorded and noted in the computer-implemented account of that consumer. Even if an action by the consumer does not, involve actually redeeming or actually taking advantage of the promotional offer right away, an action by that consumer may however, constitute a response that indicates a level of interest or lack of interest and may still be useful in revealing the consumer preference or lack thereof). For example, if a consumer saves an electronic coupon (offered as part of a test promotion) in his electronic coupon folder or forwards that coupon to a friend via an email or a social website, that action may indicate a certain level of interest and may be useful in determining the effectiveness of a given test promotion. Different types of responses by the consumers may be accorded different weights, in one or more embodiments.

The groups of consumers involved in promotion testing represent segments of the public that have been purposefully segmented in accordance with segmenting criteria specifically designed for the purpose of testing the test promotions. As the term is employed herein, a subpopulation is deemed purposefully segmented when its members are selected based on criteria other than merely to make up a given number of members in the subpopulation. Demographics, buying behavior, behavioral economics are example criteria that may be employed to purposefully segment a population into subpopulations for promotion testing. In an example, a segmented population may number in the tens or hundreds or even thousands of individuals. In contrast, the general public may involve tens of thousands, hundreds of thousands, or millions of potential customers.

By purposefully segmenting the public into small subpopulations for promotion testing, embodiments of the invention can exert control over variables such as demographics (e.g., age, income, sex, marriage status, address, etc.), buying behavior (e.g., regular purchaser of Brand X cookies, consumer of premium food, frequent traveler, etc.), weather, shopping habits, life, style, and/or any other criteria suitable for use in creating the subpopulations. More importantly, the subpopulations are kept small such that multiple test promotions may be executed on different subpopulations, either simultaneously or at different times, without undue cost or delay in order to obtain data pertaining to the test promotion response behavior. The low cost/low delay aspect of creating and executing test promotions on purposefully segmented subpopulations permits, for example, what-if testing, testing in statistically significant numbers of tests, and/or iterative testing to isolate winning features in test promotions.

Generally speaking, each individual test promotion may be designed to test one or more test promotion variables. These test promotions variables may relate to, for example, the size, shape, color, manner of display, manner of discount, manner of publicizing, manner of dissemination pertaining to the goods/services being promoted.

As a very simple example, one test promotion may involve 12-oz packages of fancy-cut potato chips with medium salt and a discount of 30% off the regular price. This test promotion may be tested on a purposefully segmented subpopulation of 35-40 years old professionals in the $30,000-$50,000 annual income range. Another test promotion may involve the same 30% discount 12-oz packages of fancy-cut potato chips with medium salt on a different purposefully segmented subpopulation of 35-40 years old professionals in the higher $100,000-$150,000 annual income range. By controlling all variables except for income range, the responses of these two test promotions, if repeated in statistically significant numbers, would likely yield fairly accurate information regarding the relationship between income for 35-40 years old professionals and their actual preference for 12-oz packages of fancy cut potato chips with medium salt.

In designing different test promotions, one or more of the test promotions variables may vary or one or more of the segmenting criteria employed to create the purposefully segmented subpopulations may vary. The test promotion responses from individuals in the subpopulations are then collected and analyzed to ascertain which test promotion or test promotion variable(s) yields/yield the most desirable response (based on some predefined success criteria, for example).

Further, the test promotions can also reveal insights regarding which subpopulation performs the best or well with respect to test promotion responses. In this manner, test promotional response analysis provides insights riot only regarding the relative performance of the test promotion and/or test promotion variable but also insights regarding population segmentation and/or segmentation criteria. In an embodiment, it is contemplated that the segments may be arbitrarily or randomly segmented into groups and test promotions may be executed against these arbitrarily segmented groups in order to obtain insights regarding personal characteristics that respond well to a particular type of promotion.

In an embodiment, the identified test promotion variable(s) that yield the most desirable responses may then be employed to formulate a general public promotion (GPP), which may then be offered to the larger public. A general public promotion is different from a test promotion in that a general public promotion is a promotion designed to be offered to members of the public to increase or maximize sales or profit whereas a test promotion is designed to be targeted to a small group of individuals fitting a specific segmentation criteria for the purpose of promotion testing. Examples of general public promotions include (but not limited to) advertisement printed in newspapers, release in public forums and websites, flyers for general distribution, announcement on radios or television, and/or promotion broadly transmitted or made available to members of the public. The general public promotion may take the form of a paper or electronic circular that offers the same promotion to the larger public, for example.

Alternatively or additionally, promotion testing may be iterated over and over with different subpopulations (segmented using the same or different segmenting criteria) and different test promotions (devised using the same or different combinations of test promotion variables) in order to validate one or more the test promotion response analysis result(s) prior to the formation of the generalized public promotion. In this manner, "false positives" may be reduced.

Since a test promotion may involve many test promotion variables, iterative test promotion testing, as mentioned, may help pin-point a variable (i.e., promotion feature) that yields the most desirable test promotion response to a particular subpopulation or to the general public.

Suppose, for example, that a manufacturer wishes to find out the most effective test promotion for packaged potato chips. One test promotion may reveal that consumers tend to buy a greater quantity of potato chips when packaged in brown paper bags versus green paper bags. That "winning" test promotion variable value (i.e., brown paper bag packaging) may be retested in another set of test promotions using different combinations of test promotion variables (such as for example with different prices, different display options, etc.) on the same or different purposefully segmented subpopulations. The follow-up test promotions may be iterated multiple times in different test promotion variable combinations and/or with different test subpopulations to validate that there is, for example, a significant consumer preference for brown paper bag packaging over other types of packaging for potato chips.

Further, individual "winning" test promotion variable values from different test promotions may be combined to enhance the efficacy of the general public promotion to be created. For example, if a 2-for-1 discount is found to be another winning variable value (e.g., consumers tend to buy a greater quantity of potato chips when offered a 2-for-1 discount), that winning test promotion variable value (e.g., the aforementioned 2-for-1 discount) of the winning test promotion variable (e.g., discount depth) may be combined with the brown paper packaging winning variable value to yield a promotion that involves discounting 2-for-1 potato chips in brown paper bag packaging.

The promotion involving discounting 2-for-1 potato chips in brown paper bag packaging may be tested further to validate the hypothesis that such a combination elicits a more desirable response than the response from test promotions using only brown paper bag packaging or from test promotions using only 2-for-1 discounts. As many of the "winning" test promotion variable values may be identified and combined in a single promotion as desired. At some point, a combination of "winning" test promotion variables (involving one, two, three, or more "winning" test promotion variables) may be employed to create the general public promotion, in one or more embodiments.

In one or more embodiments, test promotions may be executed iteratively and/or in a continual fashion on different purposefully segmented subpopulations using different combinations of test promotion variables to continue to obtain insights into consumer actual revealed preferences, even as those preferences change over time. Note that the consumer responses that are obtained from the test promotions are actual revealed preferences instead of stated preferences, in other words, the data obtained from the test promotions administered in accordance with embodiments of the invention pertains to what individual consumers actually do when presented with the actual promotions. The data is tracked and available for analysis and/or verification in individual computer-implemented accounts of individual consumers involved in the test promotions. This revealed preference approach is opposed to a stated preference approach, which stated preference data is obtained when the consumer states what he would hypothetically do in response to, for example, a hypothetically posed conjoint test question.

As such, the actual preference test promotion response data obtained in accordance with embodiments of the present invention is a more reliable indicator of what a general population member may be expected to behave when presented with the same or a similar promotion in a general public promotion. Accordingly, there is a closer relationship between the test promotion response behavior (obtained in response to the test promotions) and the general public response behavior when a general public promotion is generated based on such test promotion response data.

Also, the lower face validity of a stated preference test, even if the insights have statistical relevance, poses a practical challenge; CPG manufacturers who conduct such tests have to then communicate the insights to a retailer in order to drive real-world behavior, and convincing retailers of the validity of these tests after the fact can lead to lower credibility and lower adoption, or "signal loss" as the top concepts from these tests get re-interpreted by a third party, the retailer, who wasn't involved in the original test design.

It should be pointed out that embodiments of the inventive test promotion optimization methods and apparatuses disclosed herein operate on a forward-looking basis in that the plurality of test promotions are generated and tested on segmented subpopulations in advance of the formulation of a general public promotion. In other words, the analysis results from executing the plurality of test promotions on different purposefully segmented subpopulations are employed to generate future general public promotions. In this manner, data regarding the "expected" efficacy of the proposed general public, promotion is obtained even before the proposed general public promotion is released to the public. This is one key driver in obtaining highly effective general public promotions at low cost.

Furthermore, the subpopulations can be generated with highly granular segmenting, criteria, allowing for control of data noise that may arise due to a number of factors, some of which may be out of the control of the manufacturer or the merchant. This is in contrast to the aggregated data approach of the prior art.

For example, if two different test promotions are executed on two subpopulations shopping at the same merchant on the same date, variations in the response behavior due to time of day or traffic condition are essentially eliminated or substantially minimized in the results (since the time or day or traffic condition would affect the two subpopulations being tested in substantially the same way).

The test promotions themselves may be formulated to isolate specific test promotion variables (such as the aforementioned potato chip brown paper packaging or the 16-oz size packaging). This is also in contrast to the aggregated data approach of the prior art.

Accordingly, individual winning promotion variables may be isolated and combined to result in a more effective promotion campaign in one or more embodiments. Further, the test promotion response data may be analyzed to answer questions related to specific subpopulation attribute(s) or specific test promotion variable(s). With embodiments of the invention, it is now possible to answer, from the test subpopulation response data, questions such as "How deep of a discount is required to increase by 10% the volume of potato chip purchased by buyers who are 18-25 year-old male shopping on a Monday?" or to generate test promotions specifically designed to answer such a question. Such data granularity and analysis result would have been impossible to achieve using the backward-looking, aggregate historical data approach of the prior art.

In one or more embodiments, there is provided a promotional idea module for generating ideas for promotional concepts to test. The promotional idea generation module relies on a series of pre-constructed sentence structures that outline typical promotional constructs. For example, Buy X, get Y for $ Z price would be one sentence structure, whereas Get Y for $ Z when you buy X would be a second. It's important to differentiate that the consumer call to action in those two examples is materially different, and one cannot assume the promotional response will be the same when using, one sentence structure vs. another. The solution is flexible and dynamic, so once X, Y, and Z are identified, multiple valid sentence structures can be tested. Additionally, other variables in the sentence could be changed, such as replacing "buy" with "hurry up and buy" or "act now" or "rush to your local store to find". The solution delivers a platform where multiple products, offers, and different ways of articulating such offers can be easily generated by a lay user. The amount of combinations to test can be infinite. Further, the generation may be automated, saving time and effort in generating promotional concepts.

In one or more embodiments, once a set of concepts is developed, the technology advantageously a) will constrain offers to only test "viable promotions", i.e., those that don't violate local laws, conflict with branding guidelines, lead to unprofitable concepts that wouldn't be practically relevant, can be executed on a retailers system, etc., and/or b) link to the design of experiments for micro-testing to determine which combinations of variables to test at any given time.

In one or more embodiments, there is provided an offer selection module for enabling a non-technical audience to select viable offers for the purpose of planning traditional promotions (such as general population promotion, for example) outside the test environment. By using filters and advanced consumer-quality graphics, the offer selection module will be constrained to only show top performing concepts from the tests, with production-ready artwork wherever possible. By doing so, the offer selection module renders irrelevant the traditional, Excel-based or heavily numbers-oriented performance reports from traditional analytic tools. The user can have "freedom within a framework" by selecting any of the pre-scanned promotions for inclusion in an offer to the general public, but value is delivered to the retailer or manufacturer because the offers are constrained to only include the best performing concepts. Deviation from the top concepts can be accomplished, but only once the specific changes are run through the testing process and emerge in the offer selection windows.

In an embodiment, it is expressly contemplated that the general population and/or subpopulations may be chosen from social media site (e.g., Facebook™, Twitter™, Google+™, etc.) participants. Social media offers a large population of active participants and often provide various communication tools (e.g., email, chat, conversation streams, running posts, etc.) which makes it efficient to offer promotions and to receive responses to the promotions. Various tools and data sources exist to uncover characteristics of social media site members, which characteristics (e.g., age, sex, preferences, attitude about a particular topic, etc.) may be employed as highly granular segmentation criteria, thereby simplifying segmentation planning.

Although grocery stores and other brick-and-mortar businesses are discussed in various examples herein, it is expressly contemplated that embodiments of the invention apply also to online shopping and online advertising/promotion and online members/customers.

These and other features and advantages of embodiments of the invention may be better understood with reference to the figures and discussions that follow.

Figure 2A:
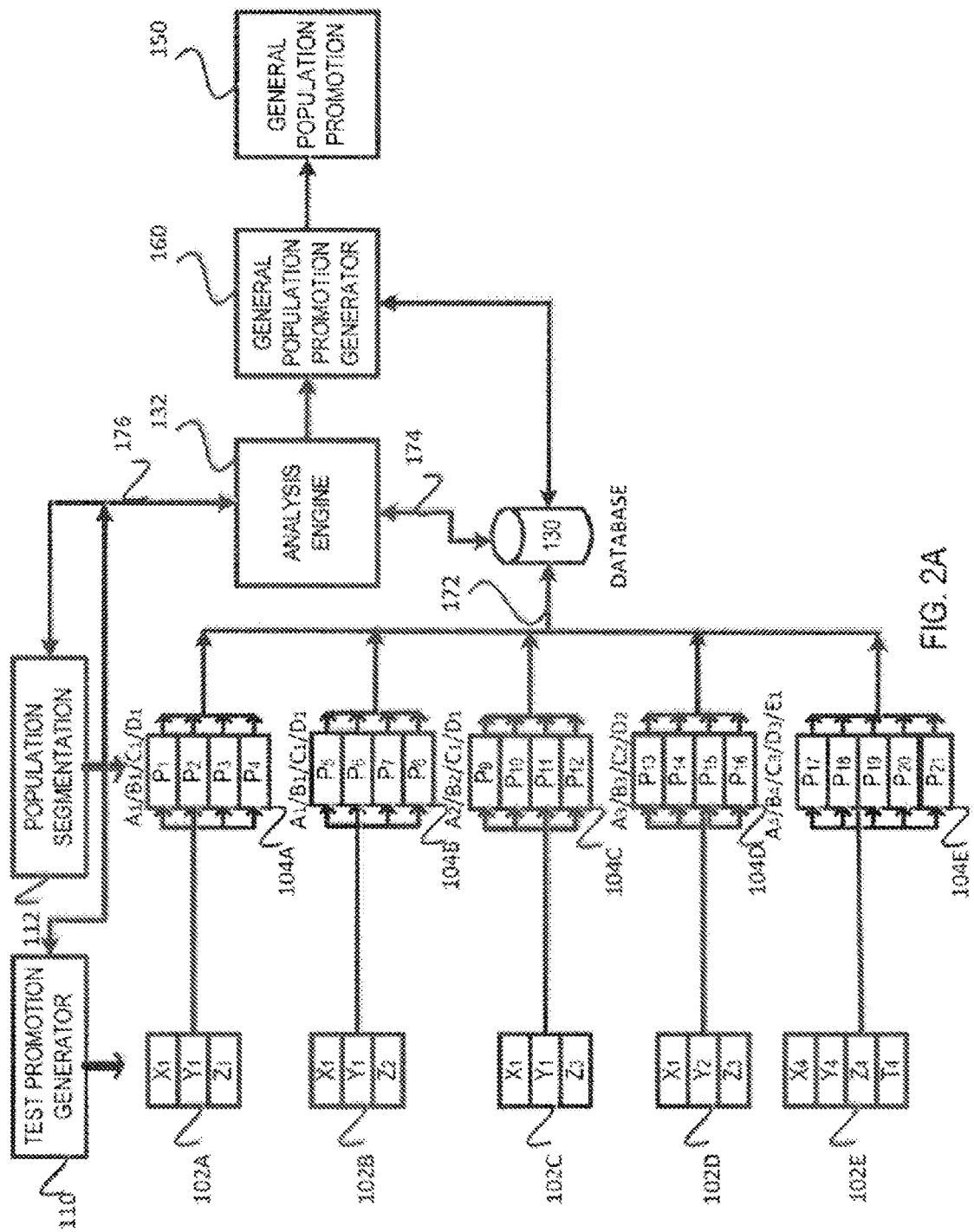
FIG. 2A shows, in accordance with an embodiment of the invention, conceptual drawing of the forward-looking promotion optimization method.

FIG. 2A shows, in accordance with an embodiment of the invention, a conceptual drawing of the forward-looking promotion optimization method. As shown in FIG. 2A, a plurality of test promotions $102a$, $102b$, $102c$, $102d$, and $102e$ are administered to purposefully segmented subpopulations $104a$, $104b$, $104c$, $104d$, and $104e$ respectively. As mentioned, each of the test promotions ($102a$-$102e$) may be designed to test one or more test promotion variables.

In the example of FIG. 2A, test promotions $102a$-$102d$ are shown testing three test promotion variables X, Y, and Z, which may represent for example the size of the packaging (e.g., 12 oz versus 16 oz), the manner of display (e.g., at the end of the aisle versus on the shelf), and the discount (e.g., 10% off versus 2-for-1). These promotion variables are of course only illustrative and almost any variable involved in producing, packaging, displaying, promoting, discounting, etc. of the packaged product may be deemed a test promotion variable if there is an interest in determining how the consumer would respond to variations of one or more of the test promotion variables. Further, although only a few test promotion variables are shown in the example of FIG. 2A, a test promotion may involve as ninny or as few of the test promotion variables as desired. For example, test promotion $102e$ is shown testing four test promotion variables (X, Y, Z, and T).

One or more of the test promotion variables may vary from test promotion to test promotion. In the example of FIG. 2A, test promotion $102a$ involves test variable X1 (representing a given value or attribute for test variable X) while test promotion $102b$ involves test variable X2 (representing a different value or attribute for test variable X). A test promotion may vary, relative to another test promotion, one test promotion variable (as can be seen in the comparison between test promotions $102a$ and $102b$) or many of the test promotion variables (as can be seen in the comparison between test promotions $102a$ and $102d$). Also, there are no requirements that all test promotions must have the same number of test promotion variables (as can be seen in the comparison between test promotions $102a$ and $102e$) although for the purpose of validating the effect of a single variable, it may be useful to keep the number and values of other variables (i.e., the control variables) relatively constant from test to test (as can be seen in the comparison between test promotions $102a$ and $102b$).

Generally speaking, the test promotions may be generated using automated test promotion generation software 110, which varies for example the test promotion variables and/or the values of the test promotion variables and/or the number of the test promotion variables to come up with different test promotions.

In the example of FIG. 2A, purposefully segmented subpopulations $104a$-$104d$ are shown segmented using four segmentation criteria A, B, C, D, which may represent for example the age of the consumer, the household income, the zip code, and whether the person is known from past purchasing, behavior to be a luxury item buyer or a value item buyer. These segmentation criteria are of course only illustrative and almost any demographics, behavioral, attitudinal, whether self-described, objective, interpolated from data sources (including past purchase or current purchase data), etc. may be used as segmentation criteria if there is an interest in determining how a particular subpopulation would likely respond to a test promotion. Further, although only a few segmentation criteria are shown in connection with subpopulations $104a$-$104d$ in the example of FIG. 2A, segmentation may involve as many or as few of the segmentation criteria as desired. For example, purposefully segmented subpopulation $104e$ is shown segmented using five segmentation criteria (A, B, C, D, and E).

In the present disclosure, a distinction is made between a purposefully segmented subpopulation and a randomly segmented subpopulation. The former denotes a conscious effort to group individuals based on one or more segmentation criteria or attributes. The latter denotes a random grouping for the purpose of forming a group irrespective of the attributes of the individuals. Randomly segmented subpopulations are useful in some cases; however they are distinguishable from purposefully segmented subpopulations when the differences are called out.

One or more of the segmentation criteria may vary from purposefully segmented subpopulation to purposefully segmented subpopulation. In the example of FIG. 2A, purposefully segmented subpopulation $104a$ involves segmentation criterion value A1 (representing a given attribute or range of attributes for segmentation criterion A) while purposefully segmented subpopulation $104c$ involves segmentation criterion value A2 (representing a different attribute or set of attributes for the same segmentation criterion A).

As can be seen, different purposefully segmented subpopulation may have different numbers of individuals. As an example, purposefully segmented subpopulation $104a$ has four individuals (P1-P4) whereas purposefully segmented subpopulation $104e$ has six individuals (P17-P22). A purposefully segmented subpopulation may differ from another purposefully segmented subpopulation m the value of a single segmentation criterion (as can be seen in the comparison between purposefully segmented subpopulation $104a$ and purposefully segmented subpopulation $104c$ wherein the attribute A changes from A1 to A2) or in the values of many segmentation criteria simultaneously (as can be seen in the comparison between purposefully segmented subpopulation $104a$ and purposefully segmented subpopulation $104d$ wherein the values for attributes A, B, C, and D are all different). Two purposefully segmented subpopulations may also be segmented identically (i.e., using the same segmentation criteria and the same values for those criteria) as can be seen in the comparison between purposefully segmented subpopulation $104a$ and purposefully segmented subpopulation $104b$.

Also, there are no requirements that all purposefully segmented subpopulations must be segmented using the same number of segmentation criteria (as can be seen in the comparison between purposefully segmented subpopulation 104a and 104e wherein purposefully segmented subpopulation 104e is segmented using five criteria and purposefully segmented subpopulation 104a is segmented using only four criteria) although for the purpose of validating the effect of a single criterion, it may be useful to keep the number and values of other segmentation criteria (e.g., the control criteria) relatively constant from purposefully segmented subpopulation to purposefully segmented subpopulation.

Generally speaking, the purposefully segmented subpopulations may be generated using automated segmentation software 112, which varies for example the segmentation criteria and/or the values of the segmentation criteria and/or the number of the segmentation criteria to come up with different purposefully segmented subpopulations.

In one or more embodiments, the test promotions are administered to individual users in the purposefully segmented subpopulations in such a way that the responses of the individual users in that purposefully segmented subpopulation can he recorded for later analysis. As an example, an electronic coupon may be presented in an individual user's computer-implemented account (e.g., shopping account or loyalty account), or emailed or otherwise transmitted to the smart phone of the individual. In an example, the user may be provided with an electronic coupon on his smart phone that is redeemable at the merchant. In FIG. 2A, this administering is represented by the lines that extend from test promotion 102a to each of individuals P1-P4 in purposefully segmented subpopulation 104a. If the user (such as user P1) makes a promotion-significant response, the response is noted in database 130.

A promotion-significant response is defined, as a response that is indicative of some level of interest or disinterest in the goods/service being promoted. In the aforementioned example, if the user P1 redeems the electronic coupon at the store, the redemption is strongly indicative of user P1's interest in the offered goods. However, responses falling short of actual redemption or actual purchase may still be significant for promotion analysis purposes. For example, if the user saves the electronic coupon in his electronic coupon folder on his smart phone, such action may be deemed to indicate a certain level of interest in the promoted goods. As another example, if the user forwards the electronic coupon to his friend or to a social network site, such forwarding may also he deemed to indicate another level of interest in the promoted goods. As another example, if the user quickly moves the coupon to trash, this action may also indicate a level of strong disinterest in the promoted goods. In one or more embodiments, weights may be accorded to various user responses to reflect the level of interest/disinterest associated with the user's responses to a test promotion. For example, actual redemption may be given a weight of 1, whereas saving to an electronic folder would be given a weight of only 0.6 and whereas an immediate deletion of the electronic coupon would be given a weight of −0.5.

Analysis engine 132 represents a software engine for analyzing the consumer responses to the test promotions. Response analysis may employ any analysis technique (including statistical analysis) that may reveal the type and degree of correlation between test promotion variables, subpopulation attributes, and promotion responses. Analysis engine 132 may, for example, ascertain that a certain test promotion variable value (such as 2-for-1 discount) may be more effective than another test promotion variable (such as 25% off) for 32-oz soft drinks if presented as an electronic coupon right before Monday Night Football. Such correlation may be employed to formulate a general population promotion (150) by a general promotion generator software (160). As can be appreciated from this discussion sequence, the optimization is a forward-looking optimization in that the results from test promotions administered in advance to purposefully segmented subpopulations are employed to generate a general promotion to be released to the public at a later date.

In one or more embodiments, the correlations ascertained by analysis engine 132 may be employed, to generate additional test promotions (arrows 172, 174, and 176) to administer to the same or a different set of purposefully segmented subpopulations. The iterative testing may be employed to vent s the consistency and/or strength of a correlation (by administering the same test promotion to a different purposefully segmented subpopulation or by combining the "winning" test promotion value with other test promotion variables and administering the re-formulated test promotion to the same or a different set of purposefully segmented subpopulations).

In one or more embodiments, a "winning" test promotion value (e.g., 20% off listed price) from one test promotion may be combined with another "winning" test promotion value (e.g., packaged in plain brown paper bags) from another test promotion to generate yet another test promotion. The test promotion that is formed from multiple "winning" test promotion values may be administered to different purposefully segmented subpopulations to ascertain if such combination would elicit even more desirable responses from the test subjects.

Since the purposefully segmented subpopulations are small and may be segmented with highly granular segmentation criteria, it large number of test promotions may be generated (also with highly granular test promotion variables) and a large number of combinations of test promotions/purposefully segmented subpopulations can be executed quickly and at a relatively low cost. The same number of promotions offered as general public promotions would have been prohibitively expensive to implement, and the large number of failed public promotions would have been costly for the manufacturers/retailers. In contrast, if a test promotion fails, the fact that the test promotion was offered to only a small number of consumers in one or more segmented subpopulations would limit the cost of failure. Thus, even if a large number of these test promotions "fail" to elicit the desired responses, the cost of conducting these small test promotions would still be quite small.

In an embodiment, it is envisioned that dozens, hundreds, or even thousands of these test promotions may be administered concurrently or staggered in time to the dozens, hundreds or thousands of segmented subpopulations. Further, the large number of test promotions executed or iteratively executed) improves the statistical validity of the correlations ascertained, by analysis engine. This is because the number of variations in test promotion variable values, subpopulation attributes, etc., can be large, thus yielding rich and granulated result data. The data-rich results enable the analysis engine to generate highly granular correlations between test promotion variables, subpopulation attributes, and type/degree of responses, as well as track changes over time. In turn, these more accurate/granular correlations help improve the probability that a general public promotion created from these correlations would likely elicit the desired response from the general public. It would also, over, time, create promotional profiles for specific categories, brands, retailers, and individual shoppers where, e.g., shopper 1 prefers contests and shopper 2 prefers instant financial savings.

Figure 2B:
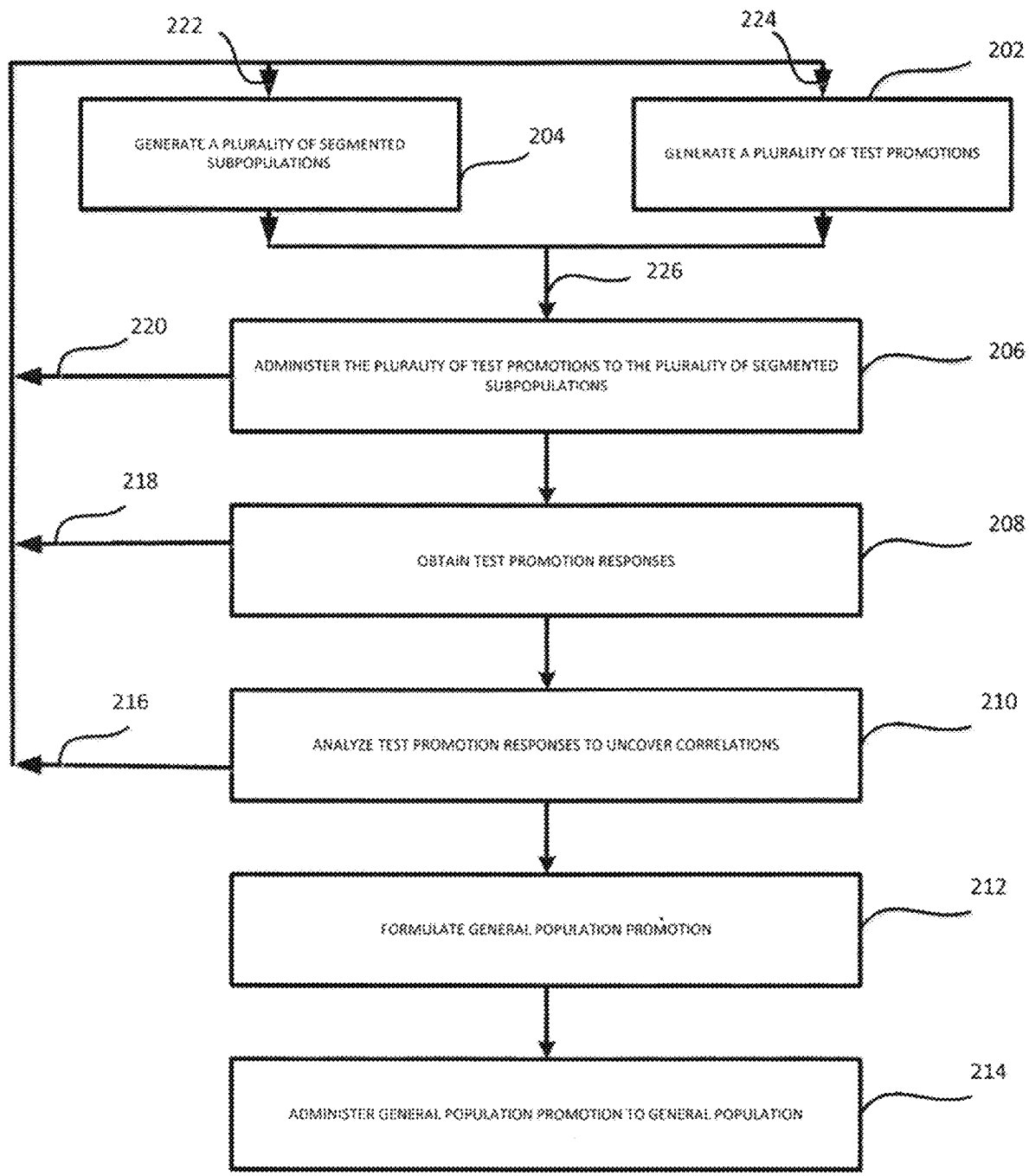
FIG. 2B shows, in accordance with an embodiment of the invention, the steps for generating a general public promotion.

FIG. 2B shows, in accordance with an embodiment of the invention, the steps for venerating a general public promotion. In one or more embodiments, each, some, or all the steps of FIG. 2B may be automated via software to automate the forward-looking promotion optimization process. In step 202, the plurality of test promotions are generated. These test promotions have been discussed in connection with test promotions 102a-102e of FIG. 2A and represent the plurality of actual promotions administered to small purposefully segmented subpopulations to allow the analysis engine to uncover highly accurate/granular correlations between test promotion variables, subpopulation attributes, and type/degree of responses In an embodiment, these test promotions may be generated using automated test promotion generation software that varies one or more of the test promotion variables, either randomly, according to heuristics, and/or responsive to hypotheses regarding correlations from analysis engine 132 for example.

In step 204, the segmented subpopulations are generated. In an embodiment, the segmented subpopulations represent randomly segmented subpopulations. In another embodiment, the segmented subpopulations represent purposefully segmented subpopulations. In another embodiment, the segmented subpopulations may represent a combination of randomly segmented subpopulations and purposefully segmented subpopulations. In an embodiment, these segmented subpopulations may be generated using automated subpopulation segmentation software that varies one or more of the segmentation criteria, either randomly, according to heuristics, and/or responsive to hypotheses regarding correlations from analysis engine 132, for example.

In step 206, the plurality of test promotions generated in step 202 are administered to the plurality of segmented sub-populations generated in step 204. In an embodiment, the test promotions are administered to individuals within the segmented subpopulation and the individual responses are obtained and recorded in a database (step 208).

In an embodiment, automated test promotion software automatically administers the test promotions to the segmented subpopulations using electronic contact data that may be obtained in advance from, for example, social media sites, a loyalty card program, previous contact with individual consumers, or potential consumer data purchased from a third party, etc. The responses may be obtained at the point of sale terminal, or via a website or program, via social media, or via an app implemented on smart phones used by the individuals, for example.

In step 210, the responses are analyzed to uncover correlations between test promotion variables, subpopulation attributes, and type/degree of responses.

In step 212, the general public promotion is formulated from the correlation data, which is uncovered by the analysis engine from data obtained via subpopulation test promotions. In an embodiment, the general public promotion may be generated automatically using public promotion generation software which utilizes at least the test promotion variables and/or subpopulation segmentation criteria and/or test subject responses and/or the analysis provided by analysis engine 132.

In step 214, the general public promotion is released to the general public to promote the goods/services.

In one or more embodiments, promotion testing using the test promotions on the segmented subpopulations occurs in parallel to the release of a general public promotion and may continue in a continual fashion to validate correlation hypotheses and/or to derive new general public promotions based on the same or different analysis results. If iterative promotion testing, involving correlation hypotheses uncovered by analysis engine 132 is desired, the same test promotions or new test promotions may be generated and executed against the same segmented subpopulations or different segmented subpopulations as needed (paths 216/222/226 or 216/224/226 or 216/222/224/226). As mentioned, iterative promotion testing may validate the correlation hypotheses, serve to eliminate "false positives" and/or uncover combinations of test promotion variables that may elicit even more favorable or different responses from the test subjects.

Promotion testing may be performed on an on-going basis using the same or different sets of test promotions on the same or different sets of segmented subpopulations as mentioned (paths 218/222/226 or 218/224/226 or 218/222/224/226 or 220/222/226 or 220/224/226 or 220/222/224/226).

Figure 3A:
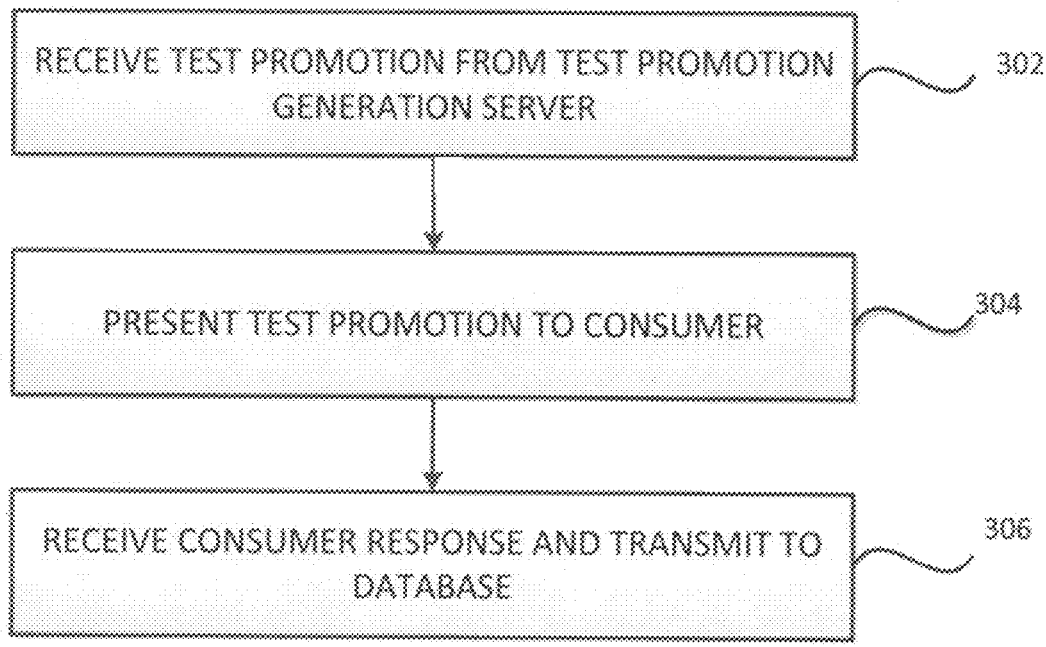
FIG. 3A shows in greater detail, in accordance with an embodiment of the invention, the administering step 206 of FIG. 2 from the user's perspective.

FIG. 3A shows in greater detail, in accordance with an embodiment of the invention, the administering step 206 of FIG. 2 from the user's perspective. In step 302, the test promotion is received from the test promotion generation server (which executes the software employed, to generate the test promotion). As examples, the test promotion may be received at a user's smart phone or tablet (such as in the case of an electronic coupon or a discount code, along with the associated promotional information pertaining to the product, place of sale, time of sale, etc.) or in a computer-implemented account (such as a loyalty program account) associated with the user that is a member of the segmented subpopulation to be tested or via one or more social media sites. In step 304, the test promotion is presented to the user. In step 306, the user's response to the test promotion is obtained and transmitted to a database for analysis.

Figure 3B:
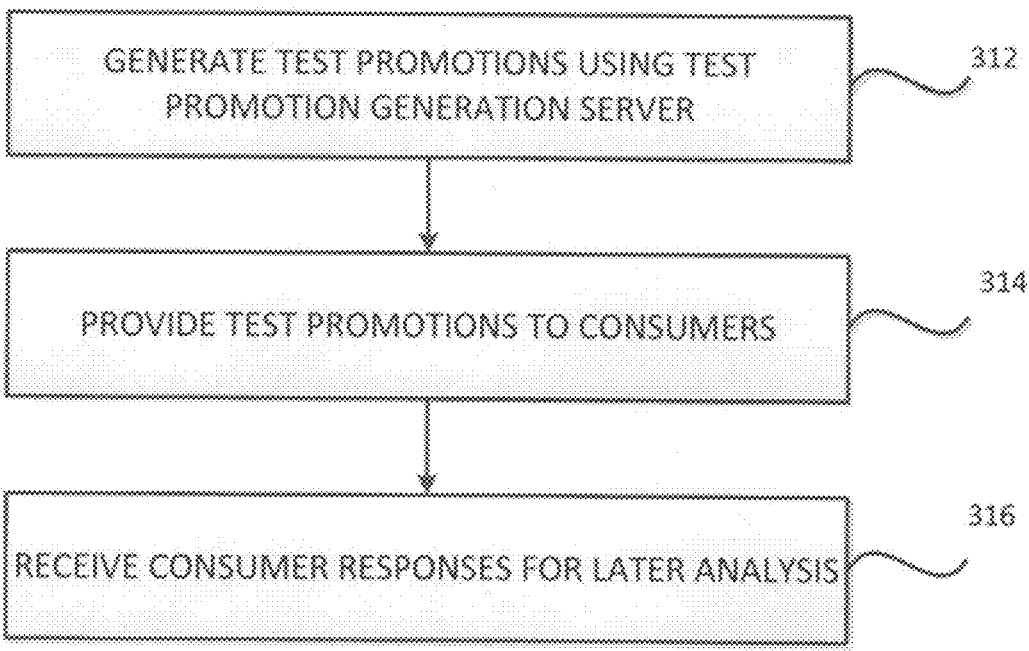
FIG. 3B shows in greater detail, in accordance with an embodiment of the invention, the administering step 206 of FIG. 2 from the forward-looking promotion optimization system perspective.

FIG. 3B shows in greater detail, in accordance with an embodiment of the invention, the administering step 206 of FIG. 2 from the forward-looking promotion optimization system perspective. In step 312, the test promotions are generated using the test promotion generation server (which executes the software employed to generate the test promotion). In step 314, the test promotions are provided to the users (e.g., transmitted or emailed to the user's smart phone or tablet or computer or shared with the user using the user's loyalty account). In step 316, the system receives the user's responses and stores the user's responses in the database for later analysis.

Figure 4:
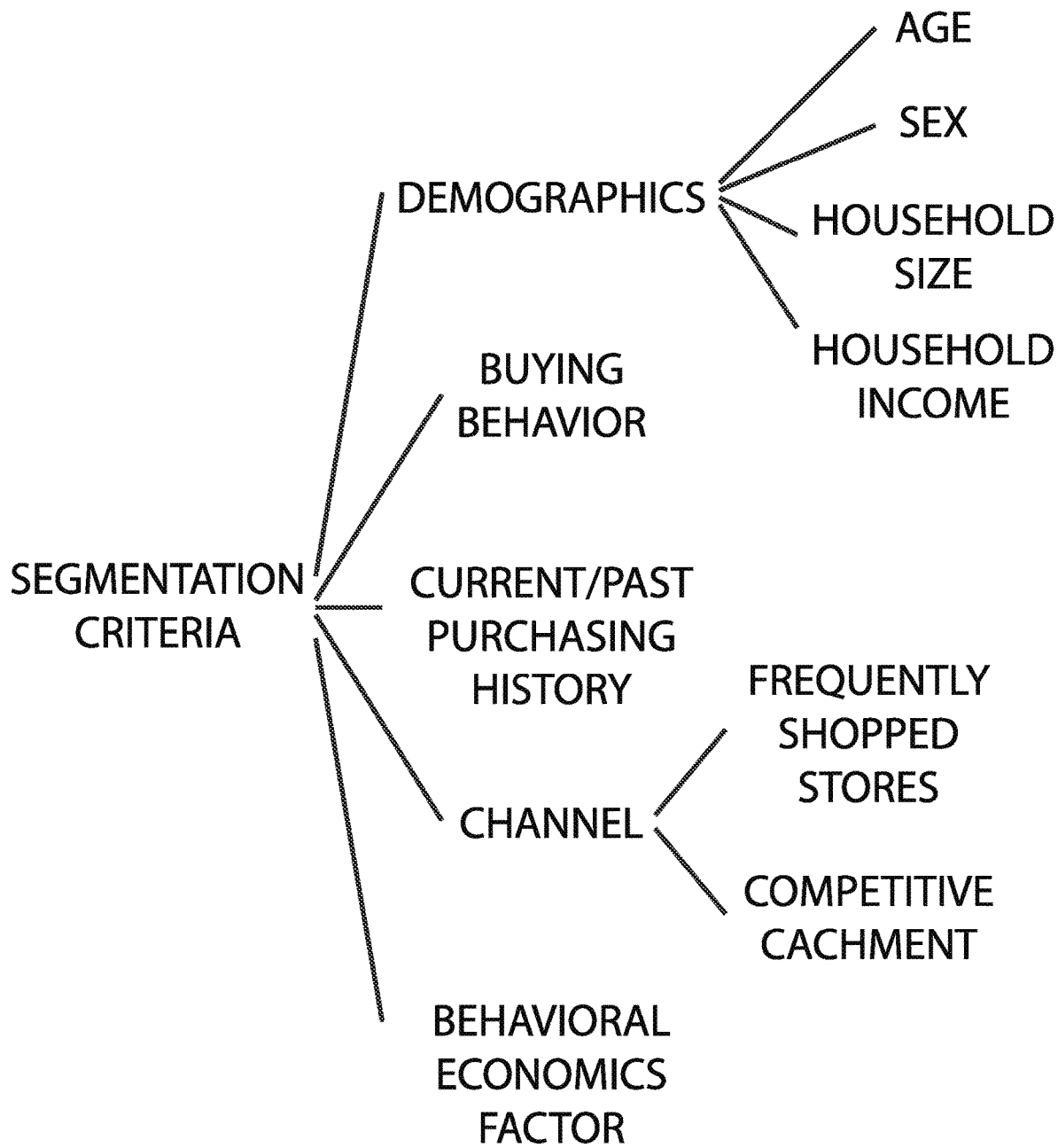
FIG. 4 shows various example segmentation criteria that may be employed to generate the purposefully segmented subpopulations.

FIG. 4 shows various example segmentation criteria that may be employed to generate the purposefully segmented subpopulations. As show in FIG. 4, demographics criteria (e.g., sex, location, household size, household income, etc.), buying behavior (category purchase index, most frequent shopping hours, value versus premium shopper, etc.), past/current purchase history, channel (e.g., stores frequently shopped at, competitive catchment of stores within driving distance, behavioral economics factors, etc., can all be used to generate with a high degree of granularity the segmented subpopulations. The examples of FIG. 4 are meant to be illustrative and not meant to be exhaustive or limiting. As mentioned, one or more embodiments of the invention generate the segmented subpopulations automatically using automated population segmentation software that generates the segmented subpopulations based on values of segmentation criteria.

Figure 5:
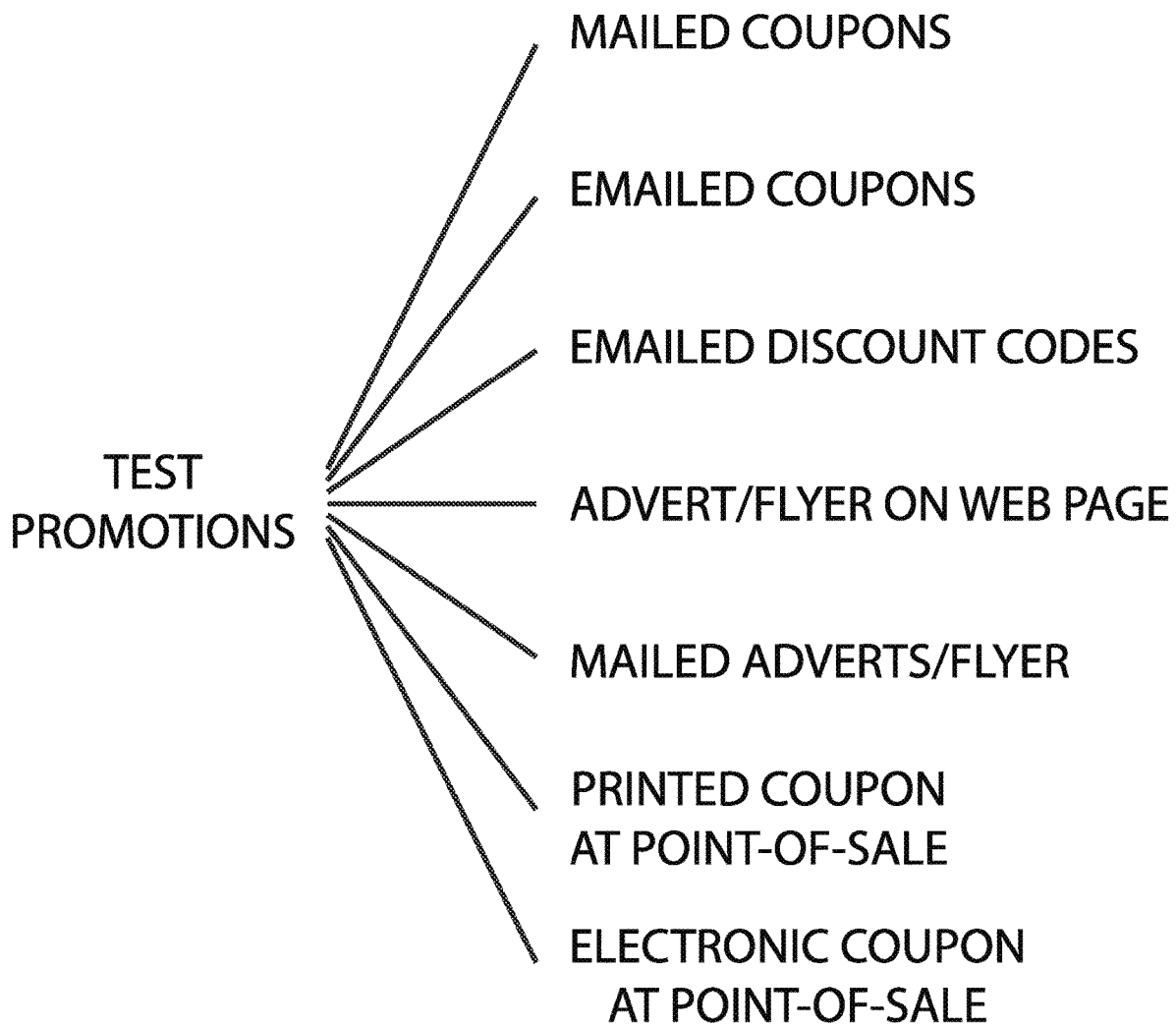
FIG. 5 shows various example methods for communicating the test promotions to individuals of the segmented subpopulations being tested.

FIG. 5 shows various example methods for communicating the test promotions to individuals of the segmented subpopulations being tested. As shown in FIG. 5, the test promotions may be mailed to the individuals, emailed in the form of text or electronic flyer or coupon or discount code, displayed on a webpage when the individual accesses his shopping or loyalty account via a computer or smart phone or tablet. Redemption may take place using, for example, a printed coupon (which may be mailed or may be printed from an electronic version of the coupon) at the point of sale terminal, an electronic version of the coupon (e.g., a screen image or QR code), the verbal providing or manual entry of a discount code into a terminal at the store or at the point of sale. The examples of FIG. 5 are meant to be illustrative and not meant to be exhaustive or limiting. One or more embodiments of the invention automatically communicate the test promotions to individuals in the segmented subpopulations using software that communicates/email/mail/administer the test promotions automatically. In this manner, subpopulation test promotions may be administered automatically, which gives manufacturers and retailers the ability to generate and administer a large number of test promotions with low cost/delay.

Figure 6:
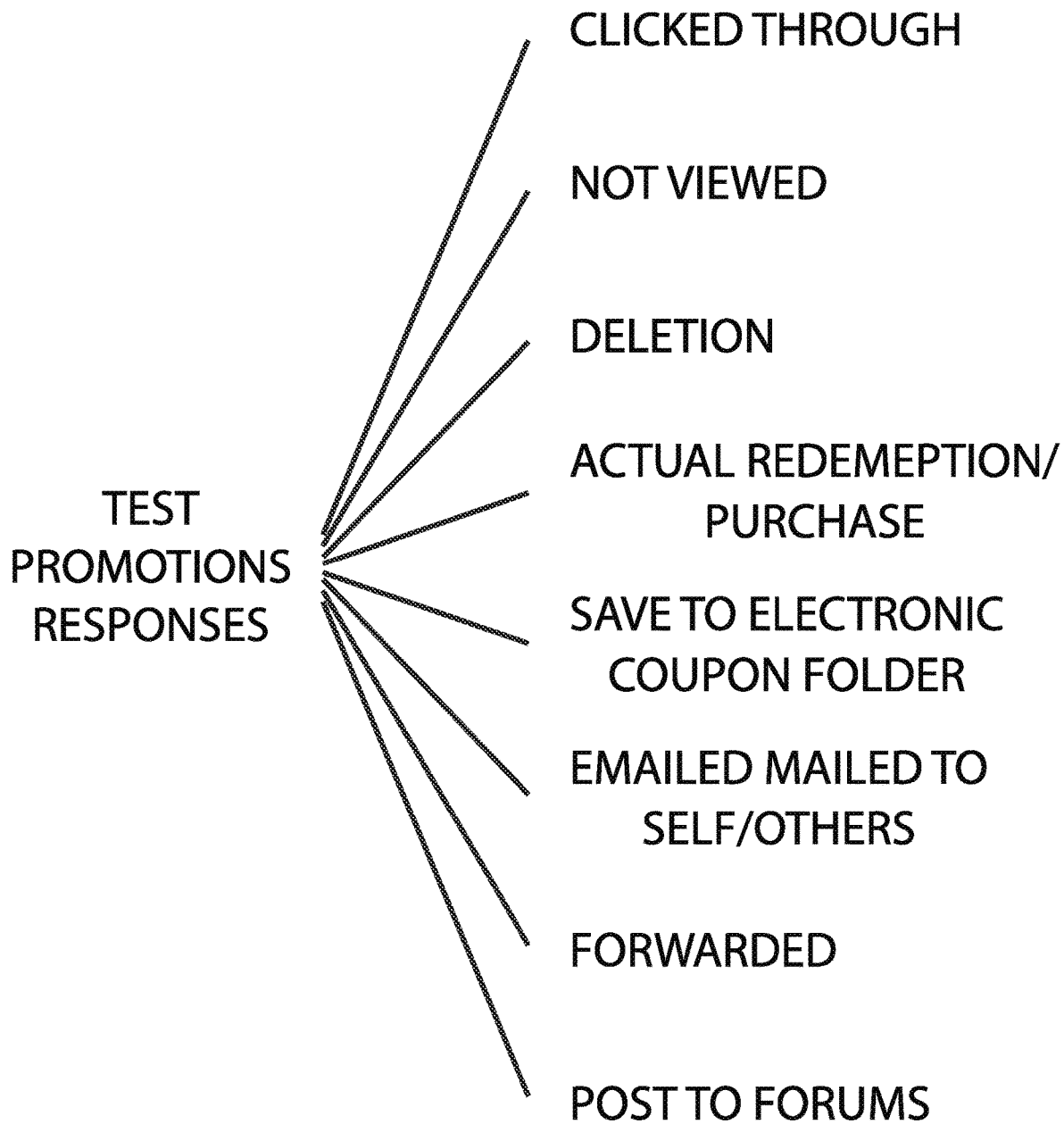
FIG. 6 shows, in accordance with an embodiment, various example promotion-significant responses.

FIG. 6 shows, in accordance with an embodiment, various example promotion-significant responses. As mentioned, redemption of the test offer is one strong indication of interest in the promotion. However, other consumer actions responsive to the receipt of a promotion may also reveal the level of interest/disinterest and may be employed by the analysis engine to ascertain which test promotion variable is likely or unlikely to elicit the desired response. Examples shown in FIG. 6 include redemption (strong interest), deletion of the promotion offer (low interest), save to electronic coupon folder (mild to strong interest), clicked to read further (mild interest), forwarding to self or others or social media sites (mild to strong interest). As mentioned, weights may be accorded to various consumer responses to allow the analysis engine to assign scores and provide user-interest data for use in formulating follow-up test promotions and/or in formulating the general public promotion. The examples of FIG. 6 are meant to be illustrative and not meant to be exhaustive or limiting.

Figure 7:
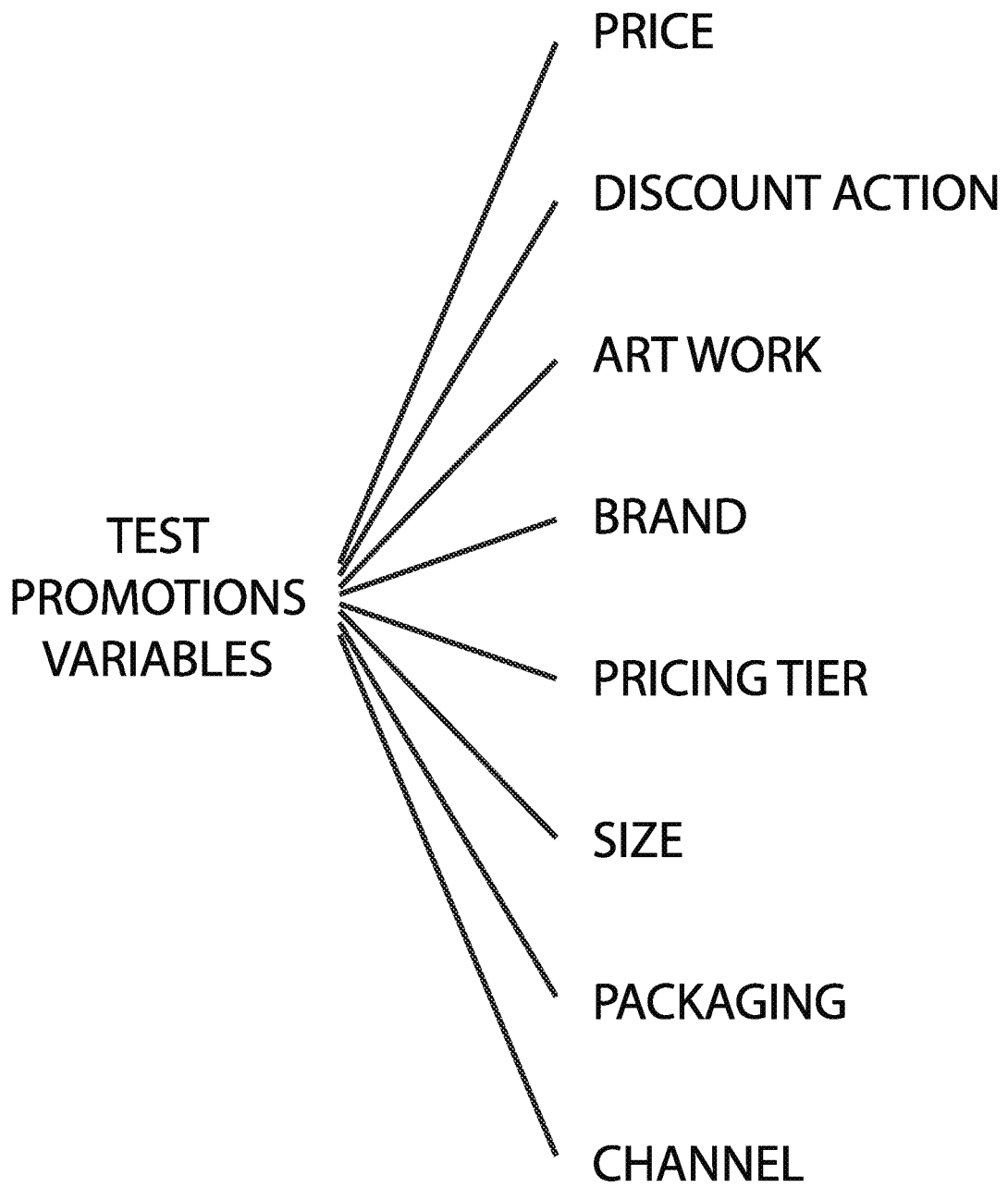
FIG. 7 shows, in accordance with an embodiment of the invention, various example test promotion variables affecting various aspects of a typical test promotion.

FIG. 7 shows, in accordance with an embodiment of the invention, various example test promotion variables affecting various aspects of a typical test promotion. As shown in FIG. 7, example test promotion variables include price, discount action (e.g., save 10%, save $1, 2-for-1 offer, etc.), artwork (e.g., the images used in the test promotion to draw interest), brand (e.g., brand X potato chips versus brand Y potato chips), pricing tier (e.g., premium, value, economy), size (e.g., 32 oz, 16 oz, 8 oz), packaging (e.g., single, 6-pack, 12-pack, paper, can, etc.), channel (e.g., email versus paper coupon versus notification in loyalty account). The examples of FIG. 7 are meant to be illustrative and not meant to be exhaustive or limiting. As mentioned, one or more embodiments of the invention involve generating the test promotions automatically using automated test promotion generation software by varying one or more of the test promotion variables, either randomly or based on feedback from the analysis of other test promotions or from the analysis of the general public promotion.

Figure 8:
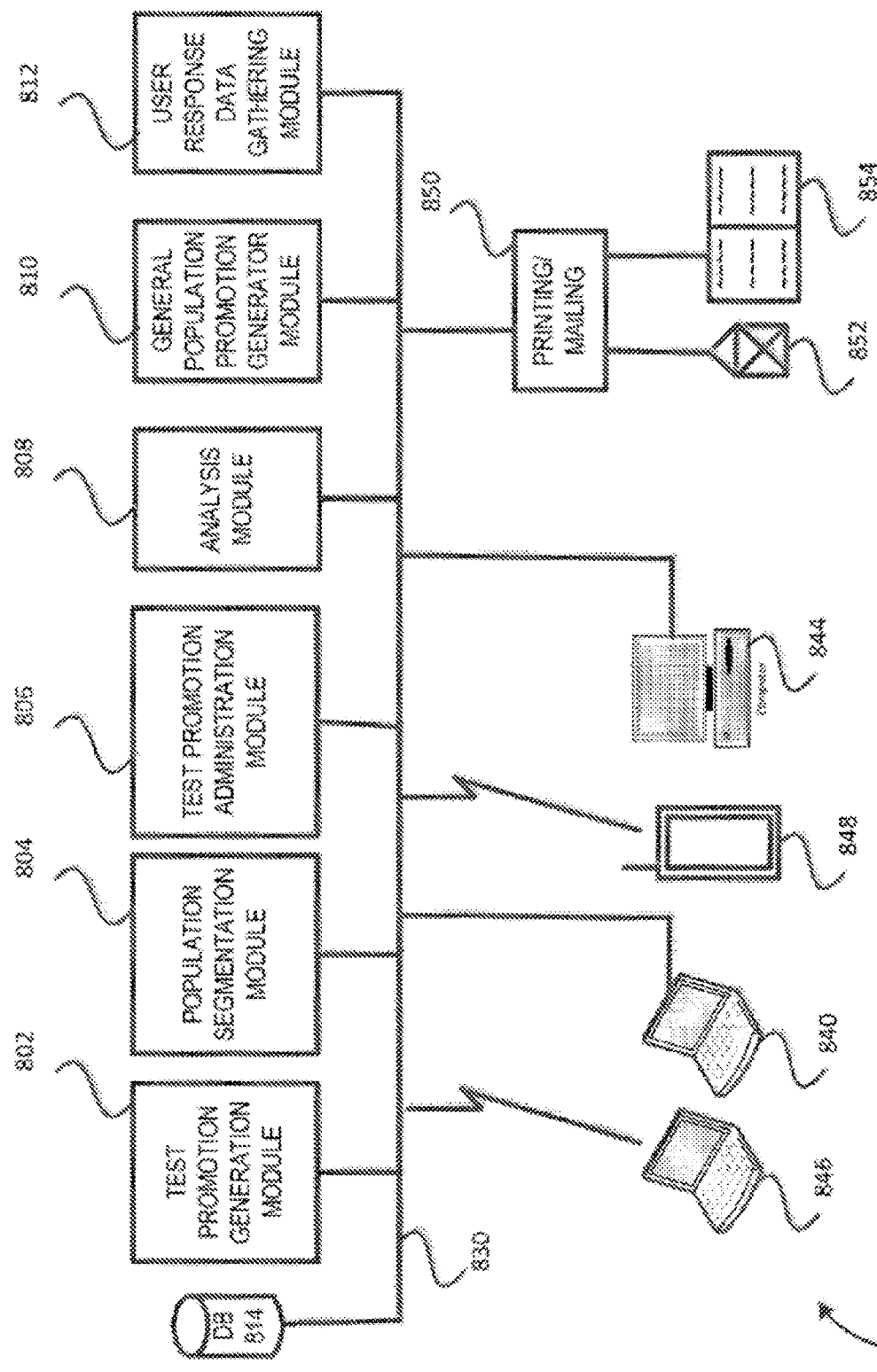
FIG. 8 shows, in accordance with an embodiment of the invention, a general hardware/network view of a forward-looking promotion optimization system.

FIG. 8 shows, in accordance with an embodiment of the invention, a general hardware/network view of the forward-looking promotion optimization system 800, in general, the various functions discussed may be implemented as software modules, which may be implemented in one or more servers (including actual and/or virtual servers). In FIG. 8, there is shown a test promotion generation module 802 for generating the test promotions in accordance with test promotion variables. There is also shown a population segmentation module 804 for generating the segmented subpopulations in accordance with segmentation criteria. There is also shown a test promotion administration module 806 for administering the plurality of test promotions to the plurality of segmented subpopulations. There is also shown an analysis module 808 for analyzing the responses to the test promotions as discussed earlier. There is also shown a general population promotion generation module 810 for generating the general population promotion using the analysis result of the data from the test promotions. There is also shown a module 812, representing the software/hardware module for receiving the responses. Module 812 may represent, for example, the point of sale terminal in a store, a shopping basket on an online shopping, website, an app on a smart phone, a webpage displayed on a computer, a social media news feed, etc. where user responses can be received.

One or more of modules 802-812 may be implemented on one or more servers, as mentioned. A database 814 is shown, representing the data store for user data and/or test promotion and/or general public promotion data and/or response data. Database 814 may be implemented by a single database or by multiple databases. The servers and database(s) may be coupled together using a local area network, an intranet, the internet, or any combination thereof (shown by reference number 830).

User interaction for test promotion administration and/or acquiring user responses may take place via one or more of user interaction devices. Examples of such user interaction devices are wired laptop 840, wired computer 844, wireless laptop 846, wireless smart phone or tablet 848. Test promotions may also be administered via printing/mailing module 850, which communicates the test promotions to the users via mailings 852 or printed circular 854. The example components of FIG. 8 are only illustrative and are not meant to be limiting of the scope of the invention. The general public promotion, once generated, may also be communicated to the public using some or all of the user interaction devices/methods discussed herein.

Generally speaking, test promotions (or generalized public promotions) are presented to consumers as offers. These offers are often online offers and may take the form of for example, digital coupons or click-through advertisements to be presented on a webpage, mobile app, text/display ads, digital coupons, digital billboard, print-at-home coupon, digital wallet, etc.

In the prior art, the process of creating offers has been largely manual. Generally speaking, the manufacturer of a product or a service provider wishing to make the promotion offer to the public needs to manually type in the promotional text and manually lay out the graphics in a format dictated by the specific platform on which the offer is published. For example, if the product is Pepsi™ and the platform is a social media site such as Facebook™, the manufacturer must comply with the layout guidelines regarding background color, foreground color, font size, character limit, margins, type of graphics, etc., of that platform Facebook™. Similarly, if the platform is a mobile device (such as a smart phone), the manufacturer must comply with the layout guidelines of the service provider associated with mobile device. The offer is then manually loaded or transferred onto the platform for presenting to the consumer.

In essence, every promotional offer needs to be manually created and tailored to the guidelines of the particular platform on which the offer is presented. If an existing offer needs to be revised, the whole process needs to be followed again. For example, if the manufacturer wishes to offer three different types of discount (e.g., 5% off, 10% off, and buy-one-get-one-free) for a particular type of soft drink and these offers need to be presented on three different platforms, nine different variations of the offer must be manually created to encapsulate the different offered discounts and to fit the requirements of the various platforms.

The manual, labor-intensive, and time-consuming manner with which promotional offers are created in the prior art presents a problem with respect to scalability. Since promotional testing may require iterating through thousands and possibly millions of different offers encapsulating different possible combinations of variable values, requiring each offer to be manually created and then tailored to the various specific platforms on which these test promotions are published may take an unduly long amount of time or may be simply too expensive to do.

Further, the burden imposed on the promotion creator to conform to layout guidelines hampers the creativity process since promotion creators now must be pre-occupied with platform-specific concerns instead of focusing on the promotion content creation process. Still further the manual, labor-intensive, and time-consuming manner with which promotional offers are created in the prior art limits creative exploration since it may simply be too expensive or time consuming to generate a large number of creative, never-tried-before promotional offers in the pursuit of what-ifs.

One or more embodiments of the invention relate to methods and apparatus for automatically generating offers to be presented on appropriate platforms from templates provided by the system and variable values acquired during the creation phase. A concept generator combination module then produces various combinations of values for the variables of the offer to create a large number of offers. An offer validation module receives the combinations produced by the concept generator combination module and performs validation.

Platform validation ensures that the produced offer conforms to the requirements of the platform on which the offer is intended to be displayed. These requirements may include for example, font color, font size, any restriction on graphics, any text field limitation, etc. Product validation ensures that the right product is offered with the right packaging, description, quantity, etc. Discount validation ensures that the type of discount offered is accurate and does not violate common sense rules (such as discounting a product so much that it becomes free or actually costs the manufacturer money when the promotion coupon is redeemed). These are only examples and are not intended to be exhaustive or limiting.

Figure 9:
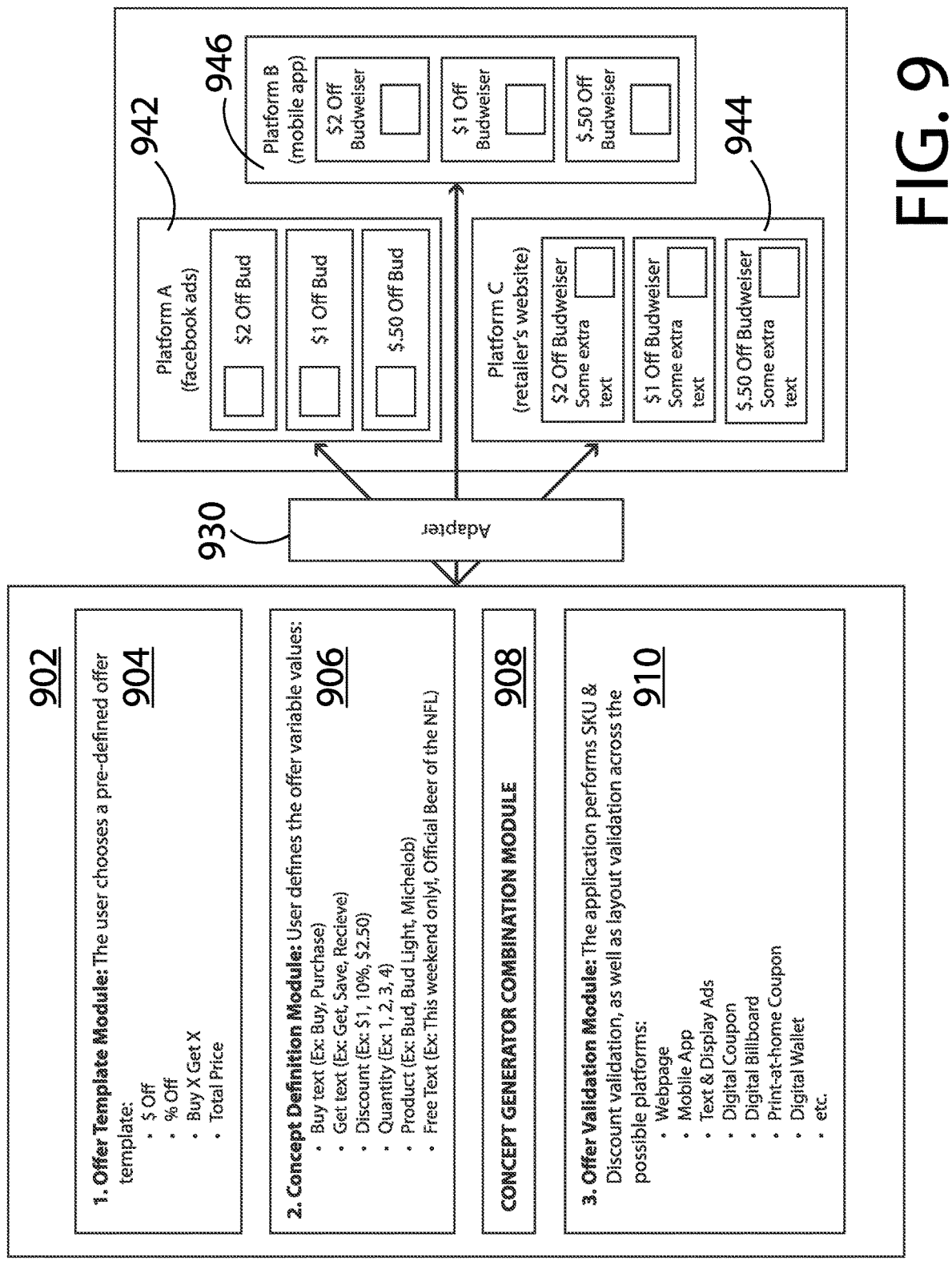
FIG. 9 shows, in accordance with an embodiment of the invention, an example concept generator 902, which includes four main modules: offer template module 904, concept definition module 906, concept generator combination module 908, and offer validation module 910.

FIG. 9 shows, in accordance with an embodiment of the invention, an example concept generator 902, which includes four main modules: offer template module 904, concept definition module 906, concept generator combination module 908, and offer validation module 910.

Offer template module 904 represents the module that offers to the user various templates implementing various promotion themes. These themes may include a certain amount off ("$ off"), a certain percentage off ("% Off"), buy something get something else for free or for reduced cost ("Buy X Get Y"), or simply the price of a product of service. Each template may have multiple layout options, representing different looks for example, for the user to pick from, if desired. Further, the user can select to have the system recommend templates around a theme that the user wishes to implement (e.g., Christmas % Off) and promotion templates pertaining to Christmas in look-and-feel with the % Off theme would be presented to the user for further operation. These are only examples and are not intended to be exhaustive or limiting.

Concept definition module 906 represents, on one embodiment, the module allowing the user to enter promotional variable values into the template(s) chosen in step 904. In an embodiment, promotional variable values represent the values that will be combined in various permutations to be offered to the user as test promotions. These values will be tested in the test promotions to determine which value or combination of values would have the greatest impact on the promotion goal if offered in a generalized public promotion.

Alternatively, the data values may be provided as a file from some other module that is responsible for variable value selection for the test promotions. In this case, concept definition module 906 represents the module for receiving such value definition file. Alternatively, concept definition module 906 may represent a user interface facility for allowing the user to enter values into the variable fields of the template.

For example in the "Buy text" variable field of the template, the choices representing values available to the user may be "Buy" or "Purchase". As another example, in the "Get text" variable field of the template, the choices representing values available to the user may be "Get" or "Save" or "Receive". As another example, in the "Discount" variable field of the template, the choices representing values available to the user may be "$1" or "10%" or "$2.50". As another example, in the "Quantity" variable field of the template, the choices representing values available to the user may be "1" or "2" or "3" or "4".

As another example, in the "Product" variable field of the template, the choices representing values available to the user may be "Bud" or "Bud Light" or "Michelob". Other attributes (e.g., type of packaging, quantity per selling unit, etc.) may also be specified in the product variable field. As another example, in the "Free text" variable field of the template, the choices representing values available to the user may be "This weekend only!" or "Official Beer of the NFL". The "Free Text" variable field may represent the field to insert statements tailored to the desired behavioral economics principle "e.g., affinity". These are only examples and are not intended to be exhaustive or limiting.

In one or more embodiments, the user may employ concept definition module 906 to also specify the platform (s) on which the promotion oilers will be manifested. Alternatively, platform specification may be specified in the offer template module phase or in the concept generator combination phase (to be discussed below) or in the offer validation module phase prior to platform validation.

Concept generator combination module 908 represents the module for iteratively forming various permutations of variable values from the values acquired by the concept definition module 906. These value permutations are then inserted into the template(s) selected by the user via the offer template module 904 to generate the set of test promotion offers.

Prior to sending the test promotion oilers to the platform, offer validation module 910 performs various types of validation on the test promotions generated by the concept generator combination module 908. Product validation may include validating the type of product offered, the brand, the quantity, the packaging, etc. For example, if a certain soft drink manufacturer only makes 30-pack in cans only and not bottle, validation would prevent the offer of a 30-pack of this soft drink in bottles.

Discount validation is another type of validation that may be performed. Discount validation ensures that the discount is of the type appropriate, and the discount does not violate certain business rules such as the discount cannot be larger than the sale price of the product or the difference between the product price and the discount price cannot fall below a certain threshold.

Platform validation ensures that the generated promotional offers conform to the requirements (e.g., layout, graphics size, character count, look-and-feel or any other constraints) imposed by the platform. These platforms may include, for example, webpage, mobile app, text/display ads, digital coupons digital billboard, print-at-home coupon, digital wallet, etc. Other types of validations may also be performed. Generally speaking, any kind of business rules may be imposed, and validation against those business rules may take place via offer validation module 910.

Validation may be based on any desired criteria, including for example any business rules imposed by the entity wishing to offer the promotion or those imposed by the designer.

Platform adapter 930 takes in the promotional offers that have been validated by offer validation module 910 and adapts them to the various platforms. Such adaptation may include adapting the offers to the transport requirement to properly transmit the offers to the platform, formatting the offers to fit the display or publishing requirements of the platforms, etc.

Every permutation may be automatically generated into offers and adapted for displaying/publishing to the various desired platforms. Example platforms include social media advertising (942), a coupon on a retailer's website (944), and a digital coupon on a mobile app (946). These are only examples and are not intended to be exhaustive or limiting.

In this manner, adapting the offers to the specific platforms is modularized such that the promotion designers are free from the burden of having to be concerned with the specific requirements of the various platforms. Further, if the platform imposes a change as to how the offer is to be presented, this change can be made in with the file employed by the adapter to perform the adaptation, and any additional offers generated are automatically adapted to the new requirements.

FIG. 10 shows, in greater detail and in accordance with an embodiment of the invention, example options that may be selected by the user via offer template module 904. If the user chooses the "$ Off" template, additional options may include the options shown by reference number 1002. If the user chooses the "% Off" template, additional options may include the options shown by reference number 1004. If the user chooses the "Free template" template (e.g., buy something, get something), additional options may include the options shown by reference number 1006. If the user chooses the "total price" template, additional options may include the options shown by reference number 1008.

The user may also have the option of taking an existing template and modify to add or remove variables, to change format (e.g., font size, foreground color, background color, margin), layout (e.g., where to place text and graphics and how to rearrange items so they appear visually as desired in the promotional offer). The user may then save the modified template for use immediately or in the future. Again, these are only examples and are not intended to be exhaustive or limiting.

Figure 11:
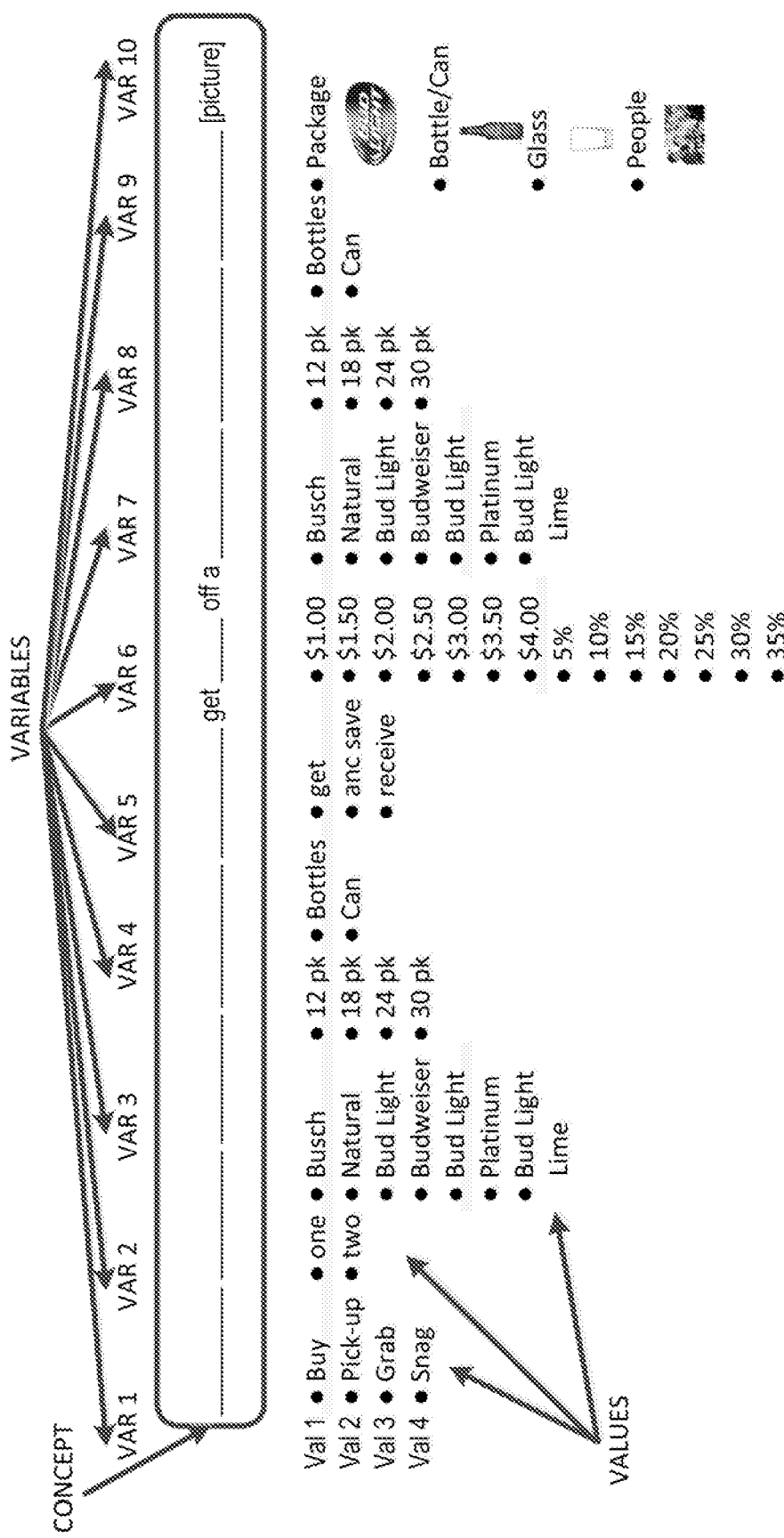
FIG. 11 shows, in accordance with an embodiment, the various values that may be employed in a hybrid template that can offer either "$ Off" or "% Off".
Figure 12:
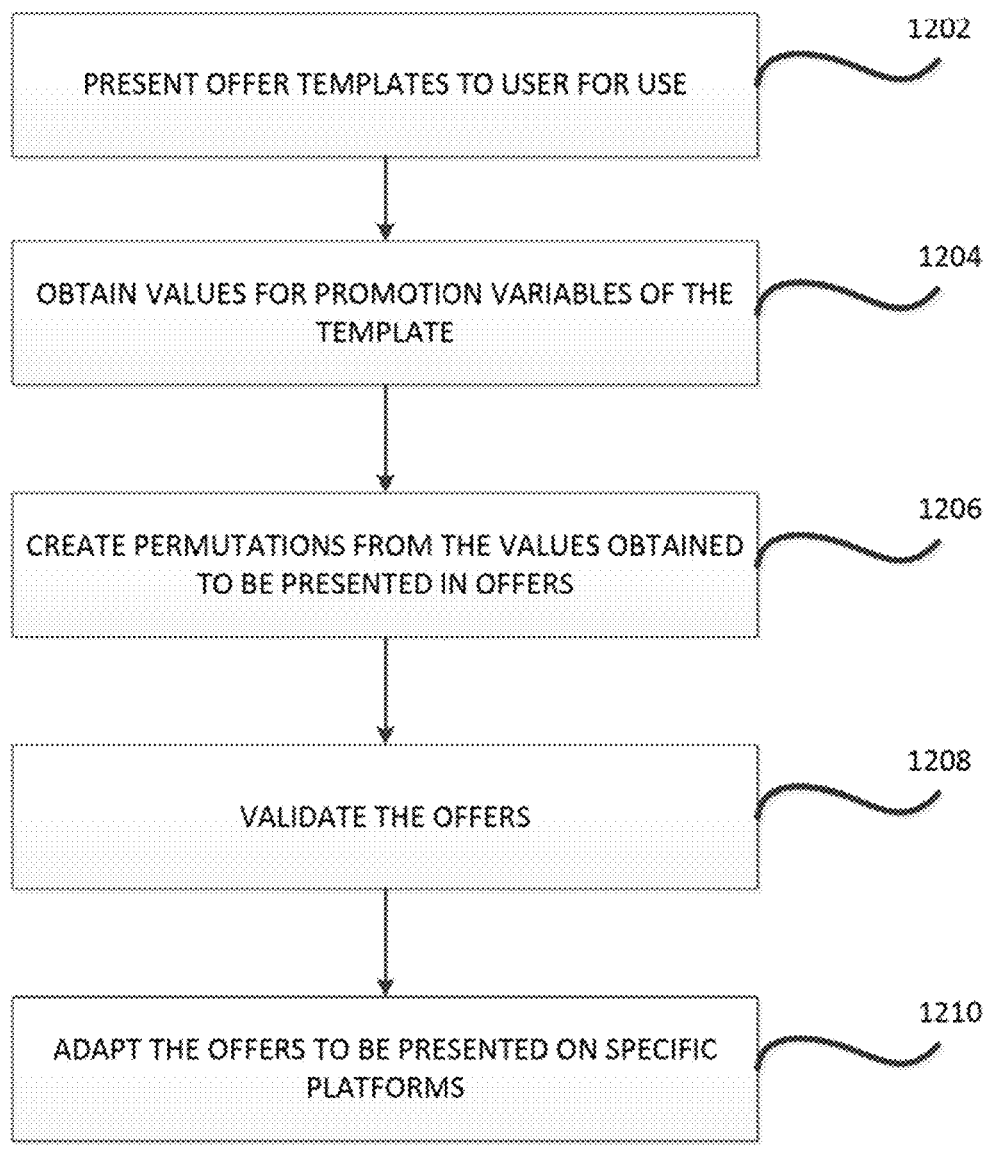
FIG. 12 shows, in accordance with an embodiment, the software-implemented steps for automatically generating promotional offers.

FIG. 11 shows, in accordance with an embodiment, the various values that may be employed in a hybrid template that can offer either "$ Off" or "% Off". Each of variables "Var 1" to "Var 10" has associated values that have been selected by the user (or some selection algorithm) for use in test promotions. For example "Var 1" represents the action word urging the consumer to do something and has four associated values: "Buy" "Pickup" "Grab" and "Snag". Var 2 represents the quantity to be promoted and has two values: "one" or "two". Var 3 represents the product to be promoted and has the values shown below Var 3 in FIG. 11: "Busch" to "Bud Light Lime". Var 10 represents the graphics and includes four options shown. Again, these are only examples and are not intended to be exhaustive or limiting.

If all combinations are to be included in the set of test promotions, a possible of 4×2×6×4×2×14×6×4×2×4 or 1,032,192 possible promotion offers are possible for this example. If the example needs to be promoted on three platforms, the total number of promotions would be 1,032,192×3 or 3,096,576. The generation of these combinations may be performed automatically using the concept generator combination module 908 of FIG. 9, for example. Without the type of automation offered by embodiments of the invention, manually creating these millions of promotion offers for the different platforms would have been impossible to do in a reasonable amount of time and/or within a reasonable budget.

Online promotional testing involves the use of a large number of different test promotions applied to different small test populations of users to glean data pertaining, to responses by the online test populations. The data obtained may then be employed to forecast actual user response in brick-and-mortar situations (such as in stores).

These test promotions may employ different permutations of promotion offers. The permutations may relate to the variations in type and how much to offer (such as 5% off, 10% off, 75 cents off, $1 off, get a free sample, a stated reduced price, etc.), in the quantity of the entity to which the offer applies (e.g., 32-oz package, 6-pack, etc.), and in the product/service to which the offer applies (e.g., soda brand A, soda brand B), if one or more conditions are associated with the offer, both the quantity and the product/service associated with the condition would also need to be specified (e.g., get $1 off a six-pack of soda brand A on condition that a 32-oz bag of potato chips brand B is purchased).

Generally speaking, it is highly desirable that the promotion definition be easy to create/edit/understand for the various human stakeholders of the promotion campaign, e.g., promotion creators, manufacturers, distributors, merchants, back-end team analyzing the data, etc. Further, it is highly desirable that the offer definition be concise, well-defined and robust such that it can readily be used by various hardware/software platforms that require such promotion definition to generate the to administer the offers online to the online test populations, and/or to analyze the responses from the online test populations.

In the current art, various possibilities exist with respect to the representation of a promotion offer. For example the GS1 specification for data encoding ("www.gs1.org") employs a series of numbers to encode information related to the sale of merchandises, and such GS1 specification may be adapted to represent a promotion offer. For example, a promotion offer that states "Save $0.75 on one bundle pack or three boxes (expires Jan. 31, 2014)" would create, for example, the pattern "8110106141411234562751106501013085093140131".

However, since the GS1 standard was developed primarily for the requirements of the barcode industry and its ecosystem, the resulting GS1 encoded pattern is difficult to decipher by human stakeholders, who may need to edit or audit the promotion offer during a promotion campaign. Further, the GS1 standard has been widely adopted for quite some time and suffers from the inflexibility associated with a legacy infrastructure in that it is very difficult to add new promotion types without requiring, a change in the hardware and/or software of the millions of terminals that have been programmed for the current GS1 specification, Adaptation of GS1 encoding for use by non-barcode systems, such as by modern social media sites or modern database engines, is also fairly difficult and technically demanding, requiring narrow and expensive expertise.

Another approach to define a promotion offer is to encode using a programming language such as Java or C. However, this approach also has its difficulties as it requires a high level of expertise to define and/or change the promotion definitions. The code would essentially be custom-built for each promotion definition, requiring a high level of expertise in order to generate and/or modify the promotion offers. It is also difficult to add, for example, new offer types since it is typically necessary to define a new class for each new offer type. Custom coding also means the code needs to be written, have quality assurance performed, and released for each promotion definition. The cycle of writing/QA/release is time-consuming and expensive and requires a high level of expertise.

Freeform text is another approach to communicate promotion offers among the various participants and to possibly represent the offer to computers. For example, the English sentence "Save $0.75 when one buys a 12-pack of Coke" may be used to represent a specific promotion offer. However, this approach depends on specific natural language and dialect (for example French versus Spanish versus Chinese versus English) and requires natural language parsing, which is still quite error-prone despite recent advances in processing logic. Furthermore, once the offer is parsed, custom coding is still required to handle the representation of various values in the freeform text sentence to software itself.

In accordance with one or more embodiments of the invention, there is provided up promotion offer language (POL), representing a concise language (including grammar and structure) for defining promotion offers that would be human readable, flexible with respect to defining or revising offers, and independent from local languages or dialects. Further, the promotion offer language offers a structure that is well-defined and capable of being accurately parsed by software, yet flexible to adapt to new promotion types or other new promotion offer requirements.

One or more embodiments of the invention relate to methods and apparatus for defining promotion offer structures. In accordance with an embodiment of the invention, promotion offers are represented by a single sentence having a well-defined structure with predefined fields. There are at least a first field and a second field.

The first field relates to the offer type. In an example, the offer type may be one of four types: dollar-off, percent-off, total price, and free. These are various ways to incentivize or reward the consumer if the consumer participates in the promotion (by, for example, buying the product for which the promotion type applies).

The second field relates to the offer expression. This offer expression defines at least the action to be taken by the purchaser (e.g., "buy", "rent", "apply for", etc.) with respect to the entity to which the offer applies and also defines the entity to which the offer applies. For example, if the promotion offer is "Save $0.75 when one buys a six-pack of soda brand A", the offer type would be the dollar-off type with a value of $0.75 in this example. The offer expression would include the action tag "buy" and a quantity parameter having the value of one six-pack and a product parameter having the value "soda brand A".

The offer expression may also include a condition. For example if the offer is "Save $0.75 off a six-pack of soda brand A when a person buys a 32-ounce bag of potato chips", the offer type and offer expression would be the same as above and the third field would relate to the condition (e.g., "when a person buys a 32-ounce bag of potato chips"). In an embodiment, the condition may be defined using the same syntax as that is employed to describe the entity to which the offer applies (e.g., involving a quantity and an identification of the product).

Figure 13:
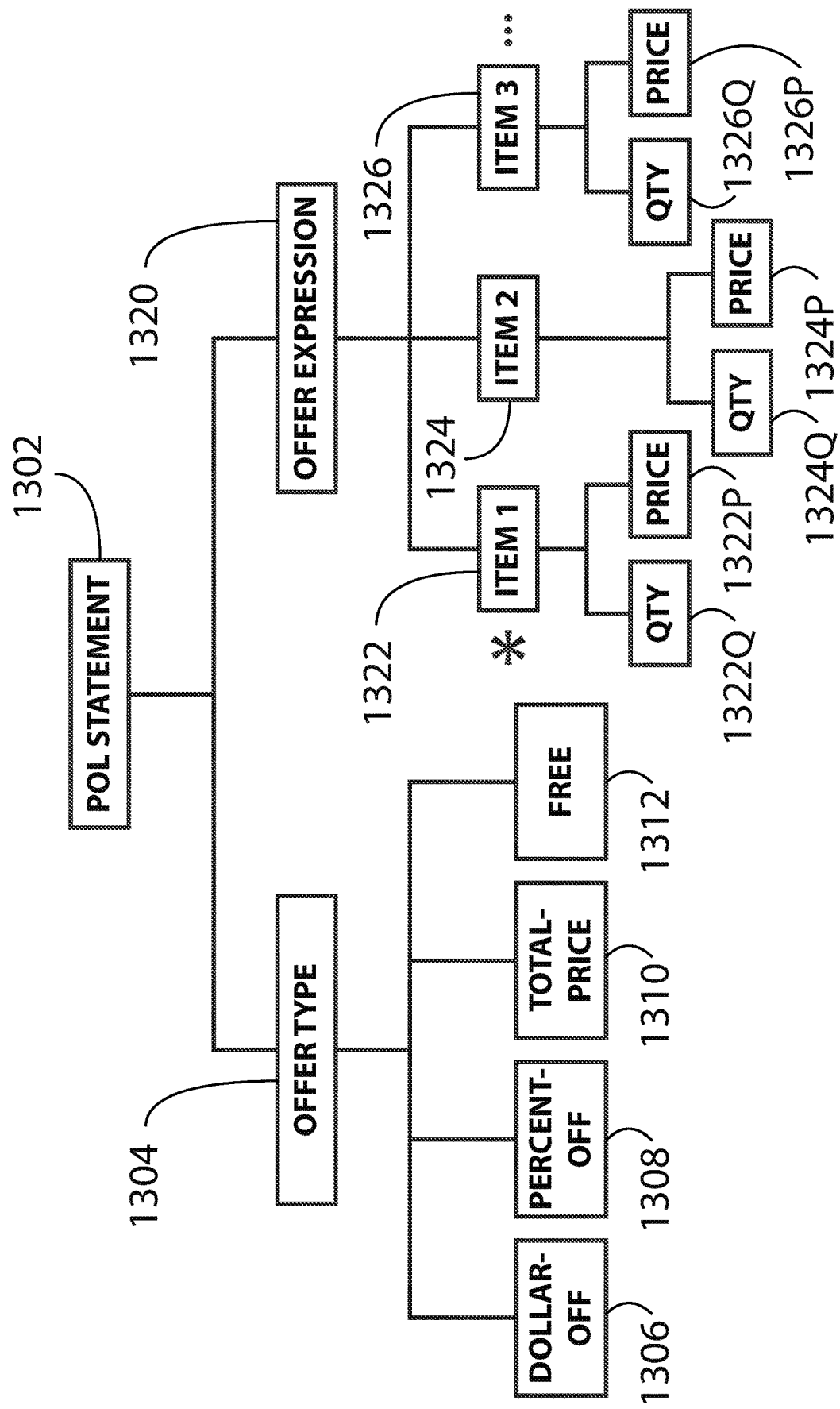
FIG. 13 shows, in accordance with an embodiment of the invention, a conceptual diagram showing the promotion offer language structure.

FIG. 13 shows, in accordance with an embodiment of the invention, a conceptual diagram showing the promotion otter language structure. The single statement promotion offer language 1302 would include offer type 1304 and offer expression 1320. In the example of FIG. 13, offer type 1304 includes few example oiler types: dollar-off 1306, percent-off 1308, total price 1310, and free 1312. These offer types are only examples and should not be interpreted as limiting of the scope of the invention.

The second component of the promotion offer language statement 1302 is offer expression 1320. Offer expression 1320 may include multiple items (which may be service items or merchandise items for example). With respect to FIG. 13, there are shown three items 1322, 1324 and 1326 (three are shown for the example although there is no limit to the number of items involved). Each of items 1322, 1324, and 1326 includes a quantity field and a product field (for the example of consumer merchandise promotion).

Accordingly, item 1322 would include quantity field 1322Q and product field 1322P; item 1324 would include quantity field 1324Q and product field 1324P; item 1326 may include quantity field 1326Q and a product field 1326P. Multiple items are possible since an offer may relate to an offer for one item, two or three items in the alternative, or multiple items together in a package and may involve both the item to which the offer applies as well as the item associated with the condition for the offer.

At least one of the items associated with offer expression 1320 is designated an OAT item (Offer_Applies_To), signifying that the specific item represents the item to which the offer applies. Generally speaking, the offer may apply to a single item, multiple items in the alternative, or multiple items together or any Boolean combination thereof. In the example of FIG. 13, item 1322 is designated the OAT item.

The condition may also be expressed by one of the items 1322, 1324, and 1326 (other than the item already employed to express the item that the offer applies to). For example, one of the items may represent the 32-ounce bag of potato chips, the purchase of which is the condition for receiving the $0.75 of offer discussed earlier.

Consider the following promotion offer example. Get {10% or 20% or 30%} off {1 bag or 2 bags} of {potato chips A, potato chips B, or potato chips C} when you buy {2, 3, or 4} of {6-pack of soda D or 12-pack of soda D}. This promotion offer example maps to the POL expression discussed in FIG. 13 in the following manner.

The offer type 1304 is percent-off and its value may be 10%, 20%, or 30%. In an implementation, the offer type "percent-off" is specified during the promotion offer definition stage using the POL statement, while the permissible values of "percent-off" for this specific promotion offer campaign (10%, 20%, or 30% off) may be specified by separately designating possible values for the "percent-off"

type. The concept of specifying permissible values for offer type 1304 would be readily understood by those familiar with specifying permissible values for a given typed variable in the programming art. In this manner, if the test promotion designer wishes to change the permissible values while keeping the promotion offer structure the same (e.g., still keeping the promotion offer percent-off instead of dollar-off while changing just the permissible percent-off values to include 40%), all that is required would be to change the specification of the set of permissible values for offer type "percent-off" while keeping the POL statement unchanged.

The definition for {1 bag or 2 bags} of {potato chips A, potato chips B, or potato chips C} would map to offer expression 1320 and more specifically to item 1322 via quantity field 1322Q and product field 1322P respectively. Again, the permissible values for quantity (e.g., 1 bag or 2 bags) and product (e.g., potato chips A, potato chips B, or potato chips C) may be specified separately if desired to promote modularity between specifying the promotion offer definition via the POL statement and specifying the permissible values for the various fields of the POL statement in an embodiment, a flag/symbol (such as "*" or any other suitable flag/symbol) may immediately precede or immediately follow or otherwise associated with item 1322 to designate item 1322 to be the item that offer type 1304 applies to (i.e., the OAT item discussed earlier).

The definition for the condition {2, 3, or 4} of {6-pack of soda D or 12-pack of soda D} would map to offer expression 1320 and more specifically to item 1324 via quantity field 1324Q and product field 1324P respectively. Since no OAT (Offer_Applies_To) flag/symbol is associated with item 1324, item 1324 is understood to not be an item that the offer applies to. Instead, it is an item associated with a condition for the offer.

FIG. 4 shows, in accordance with an embodiment of the invention, in greater detail the grammar structure of the promotion offer language statement that can be employed to represent a promotion offer to a computer and/or human stakeholders. POL statement 1400 <pol-expr> includes an optional expression flag 1404 "offer" to indicate that what follows would be a promotion offer statement. The specific flag employed (e.g., "offer" in this embodiment) may be substituted by any other suitable flag/symbol as long as it is understood to be a flag that indicates what follows to be a promotion offer statement.

POL statement 1400 <pol-expr> also includes a field <offer-type> 1406, an optional separator 1408, and field <buy-expr> 1410. The <offer-type> 1406 represents the above-discussed offer type (1304 of FIG. 13). The <buy-expr> 1410 represents the offer expression (1320 of FIG. 13).

As shown in FIG. 14, <offer-type> 1406 may represent, in the example of the promotion offer for a consumer product, either a dollar-off, percent-off, free or total price type of offer. The <buy-expr> 1410 includes the action word 1440 (e.g., "buy") and the selected item expression <s-item-expr> 1412. Action word 1440 specifies the action that the buyer needs to take to benefit from the promotion offer with respect to the item/service that the promotion offer applies to. Common action words may be, for example, "buy", "rent", "lease", "hire", "register" etc.

Selected item expression <s-item-expr> 1412 is the set of items to which the offer applies and/or to which a condition applies. For example, if the promotion oiler is $0.75 off one six-pack of soda brand A if you buy three 32-ounce bags of potato chips, <s-item-expr> 1412 represents the data structure for encoding the item to which the offer applies (one six-pack of soda brand A) and the item to which the condition applies (three 32-ounce bags of potato chips).

The distinction between which item the offer applies is made by designating one of the items with an OAT (Offer Applies To) flag (such as the aforementioned "*") as mentioned earlier. The OAT flag is generally compatible with "percent-off" offer type and "free" oiler type since these types require the identification of a specific product to which an offer applies.

An item that is not marked with an OAT flag in the selected item expression <s-item-expr> 1412 is assumed to be associated with a condition, as mentioned earlier. Thus the statement "<s-item-expr>:==*<item-expr>|<item-expr>" denotes the grammar rule that the selected item expression <s-item-expr> 1412 can be either an item expression *<item-expr>, wherein the flag "*" denotes that this is an item to which the offer applies (OAT item) or an item expression <item-expr>, wherein the absence of the flag "*" denotes that this is an item associated with a condition. Note that there must he at least one flagged <item-expr> in the selected item expression <s-item-expr> since the offer must involve at least one item or some type of service that the vendor is providing to the customer. In an embodiment, the total absence of any OAT flag (e.g., the above-mentioned flag "*") denotes that the offer applies to all items in the selected item expression <s-item-expr> 1412.

Item expression <item-expr> 1412 may be specified by single quantity/product data unit (e.g., buy bag of potato chips) or multiple quantity/product data units in the alternative (e.g., buy bag of potato chips or buy bottle of juice) or multiple quantity/product data units together (buy bag of potato chips and buy bottle of juice) or any Boolean combination involving multiple quantity/product data units. Generally speaking, any item expression can be associated with the OAT flag, regardless of whether it's nested or top level and item expressions can be built of other item expressions, recursively.

The quantity <qty> 1430 specifies how many units are involved (e.g., 1, 2, or 3). The product <product> 1432 identifies the consumer product (e.g., soda, potato chips) involved in the example. In an embodiment, the size and/or packaging of the product unit (e.g., 6-ounce bag, 12-ounce box, 6-pack, etc.) may be identified by the <product> 1432 specification. Alternatively or additionally, the size and/or the product unit may be identified by the quantity <qty> 1430 specification (e.g., 1 6-ounce bag, 2 12-ounce box, etc.).

FIG. 15 shows various examples of the promotion offer language statements and corresponding explanations thereof. POL statement 1502A represents the statement that would be specified by the promotion offer designer and employed by software in order to implement/measure the promotion oilers of the promotion offer campaign. As can be seen, statement 1502A is also more readily human readable (compared with, for example, GS1 encoding or java coding) such that the human stakeholders in the promotion offer campaign could readily understand what is being offered upon seeing the POL statement. Generally speaking, due to its intuitive nature and highly structured construction, statement 1502A can be readily understood by both human beings and computers, eliminating possible errors from parsing or human interpretation as would be the case with the natural language approach. POL statement explanation 1502B shows in plain language the meaning of the promotion offer communicated by POL statement 1502A.

POL statement 1504A and its explanation 1504B represent another example promotion offer. POL statement 1506A and its explanation 1506B represent yet another example promotion offer. POL statement 1508A and its explanation 1508B represent yet another example promotion offer.

As can be appreciated by the foregoing, embodiments of the invention define a POL structure for communicating promotion offers in a manner that is human readable while staying concise and machine friendly. The resulting POL statement is highly structured, lending itself to accurate parsing by software. Since POL statements employ clearly defined fields that occur in predefined order in the statement, this approach is independent of specific natural languages and dialects (such as French, Spanish, Chinese, American South versus American Boston, etc.) and thereby avoids the problem of ambiguities during parsing. In other words, although the promotion offer is represented using "English-like" field names and tags, POL grammar/syntax operates not in accordance with the grammar/syntax of the English language but in accordance with the grammar/syntax of its own as disclosed herein. As such, it is independent of specific natural language/dialect in the manner that the programming language C or Java is independent of the English (or French or Russian) native language and dialect.

Being highly structured, the POL statement architecture also lends itself to simplified mapping to various software platforms. For example, the POL statement constructed in accordance with the POL grammar/syntax discussed herein may be employed by software for automatically generating the desired promotion offer combinations, by a social media platform or loyalty program website for presenting the test promotion offers to users, and by back-end software for analyzing user response data. Furthermore, the promotion offer language is also highly flexible, allowing the test promotion offer designer to easily edit an offer type or add new offer types (e.g., by simply editing and adding, to the offer types 1304 of FIG. 13).

While this invention has been described in terms of several preferred embodiments, there are alterations, permutations, and equivalents, which fall within the scope of this invention. The invention should be understood to also encompass these alterations, permutations, and equivalents, it should also be noted that there are man alternative ways of implementing the methods and apparatuses of the present invention. Although various examples are provided herein, it is intended that these examples be illustrative and not limiting with respect to the invention.

The invention claimed is:

1. A computer-implemented method for generating a plurality of test promotions that is performed by a promotion optimization system, containing a promotion module, an administration module, and a monitoring module, the method comprising:
   displaying to a user a plurality of offer templates corresponding to types of offers;
   receiving, from the user, a selection of a desired template from the plurality of offer templates;
   receiving a selection of an offer expression selected from a subset of offer expressions associated with the selected desired template, and wherein each offer expression includes an action, wherein the offer expression is in a non-standardized format;
   converting, by the promotion optimization system using a processor the non-standardized offer expression into a standardized statement that is human readable yet in a standardized machine-readable format, comprising a flag indicating the statement is an offer, an offer type field associated with the desired template and the offer expression, formatted as offer<offer-type> on <buy-expr> wherein the <offer-type> is equal to dollar_off-|percent_off|free|total_price, and wherein the <offer expr> is equal to one of buy(<s-item-expr>), rent(<s-item-expr>), lease(<s-item-expr>), and register(<s-item-expr>), and wherein the <s-item-expr> is equal to *<item-expr>|<item-expr> and further wherein <item-expr> is equal to item(<qty>,<product>);
   transmitting the statement to a plurality of software platforms operating on a plurality of servers;
   mapping the statement to the plurality of software platforms;
   adapting the mapped statements on each of the plurality of platforms by transport requirements and formatting requirements of each of the plurality of platforms.

2. The method of claim 1, wherein each of the templates has a plurality of layout options.

3. The method of claim 2, further comprising recommending one of the plurality of templates and one of plurality of the layout options to the user based upon a preferred theme.

4. The method of claim 1, wherein variable values are the values that will be tested in various permutations during test promotion administration.

5. The method of claim 4, wherein the variable values are received from the user.

6. The method of claim 4, wherein the variable values are received from a computer module that selects which variable values to use.

7. The method of claim 1, further comprising filtering schemes used to filter the raw set of test promotions, wherein the filtering schemes include product validations, each associated with a product type, brand, quantity and packaging.

8. The method of claim 7, wherein the plurality of filtering schemes include discount validations, each associated with a logical filtering element business rule.

9. The method of claim 7, wherein the plurality of filtering schemes include platform validations, each associated with a platform.

10. The method of claim 1, further comprising adapting the test promotions to a plurality of platforms, including applying transporting requirements and formatting the images to fit a display space.

* * * * *